(12) United States Patent
Mo et al.

(10) Patent No.: US 12,153,936 B2
(45) Date of Patent: Nov. 26, 2024

(54) METHOD FOR DISPLAYING SPLASH SCREEN INFORMATION OF APPLICATION AND ELECTRONIC DEVICE

(71) Applicant: Huawei Technologies Co., Ltd., Shenzhen (CN)

(72) Inventors: Lan Mo, Nanjing (CN); Youqi Jin, Nanjing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 17/632,279

(22) PCT Filed: Aug. 3, 2020

(86) PCT No.: PCT/CN2020/106652
§ 371 (c)(1),
(2) Date: Feb. 2, 2022

(87) PCT Pub. No.: WO2021/023163
PCT Pub. Date: Feb. 11, 2021

(65) Prior Publication Data
US 2022/0291934 A1 Sep. 15, 2022

(30) Foreign Application Priority Data
Aug. 7, 2019 (CN) .......................... 201910727530.9

(51) Int. Cl.
*G06F 9/445* (2018.01)
*G06F 9/451* (2018.01)
(Continued)

(52) U.S. Cl.
CPC .............. *G06F 9/445* (2013.01); *G06F 9/451* (2018.02); *H04M 1/72403* (2021.01); *H04M 1/72454* (2021.01); *H04M 1/72469* (2021.01)

(58) Field of Classification Search
CPC .... G06F 9/445; G06F 9/451; H04M 1/72403; H04M 1/72454; H04M 1/72469
See application file for complete search history.

(56) References Cited

U.S. PATENT DOCUMENTS 6,173,445 B1 * 1/2001 Robins .................... G06F 9/451
717/173
8,612,967 B1 12/2013 Delker
(Continued)

FOREIGN PATENT DOCUMENTS

CN  102084385 A  6/2011
CN  103095840 A  5/2013
(Continued)

OTHER PUBLICATIONS

Operating Systems, https://web.archive.org/web/20180403172719/http://homepage.cs.uri.edu/faculty/wolfe/book/Readings/Reading07.htm, Apr. 3, 2018 (Year: 2018).*

*Primary Examiner* — Nicholas Ulrich
(74) *Attorney, Agent, or Firm* — Slater Matsil, LLP

(57) ABSTRACT

A method for displaying splash screen information of an application and an electronic device. The method includes receiving, by an electronic device, an operation, performed by a user, of opening a first application, determining, using an operating system of the electronic device, that the first application has a splash screen function, determining that a system splash screen capability is enabled for the first application, obtaining splash screen information of the first application, where the splash screen information includes at least one of a brand slogan or a splash screen advertisement of the first application, loading and rendering the splash screen information of the first application, displaying, by the electronic device, the splash screen information of the first application, and starting the first application after displaying (Continued)

the splash screen information, and displaying a page of the first application.

21 Claims, 9 Drawing Sheets

(51) Int. Cl.
*H04M 1/72403* (2021.01)
*H04M 1/72454* (2021.01)
*H04M 1/72469* (2021.01)

(56) References Cited

U.S. PATENT DOCUMENTS

| | | | |
|---|---|---|---|
| 8,799,077 | B2 | 8/2014 | Flake et al. |
| 10,152,734 | B1 | 12/2018 | Nath et al. |
| 2002/0103941 | A1* | 8/2002 | Yip .................... G06F 9/45512 |
| | | | 719/310 |
| 2013/0055121 | A1 | 2/2013 | Cho et al. |
| 2014/0019253 | A1* | 1/2014 | Ricasata ............ G06Q 30/0241 |
| | | | 705/14.66 |
| 2014/0089397 | A1* | 3/2014 | Lin ...................... H04L 67/306 |
| | | | 709/203 |
| 2016/0321690 | A1 | 11/2016 | Ma |
| 2017/0103422 | A1 | 4/2017 | Glover et al. |
| 2017/0169429 | A1* | 6/2017 | Chen .................... H04L 67/306 |
| 2018/0307497 | A1 | 10/2018 | Chandrasekaran et al. |
| 2018/0322525 | A1 | 11/2018 | Ungerer et al. |
| 2019/0141364 | A1 | 5/2019 | Papish et al. |

FOREIGN PATENT DOCUMENTS

| | | |
|---|---|---|
| CN | 106385494 A | 2/2017 |
| CN | 106775817 A | 5/2017 |
| CN | 107846511 A | 3/2018 |
| CN | 108984395 A | 12/2018 |
| CN | 109542650 A | 3/2019 |
| CN | 109670868 A | 4/2019 |
| CN | 110430324 A | 11/2019 |
| IN | 106033361 A | 10/2016 |
| WO | 2017015139 A1 | 1/2017 |
| WO | 2017028722 A1 | 2/2017 |
| WO | 2018204834 A1 | 11/2018 |
| WO | 2018233439 A1 | 12/2018 |

\* cited by examiner

METHOD FOR DISPLAYING SPLASH SCREEN INFORMATION OF APPLICATION AND ELECTRONIC DEVICE

CROSS REFERENCE TO RELATED APPLICATIONS

This application is a national stage of International Application No. PCT/CN2020/106652, filed on Aug. 3, 2020, which claims priority to Chinese Patent Application No. 201910727530.9, filed on Aug. 7, 2019. Both of the aforementioned applications are hereby incorporated by reference in their entireties.

TECHNICAL FIELD

This application relates to the field of electronic devices, and in particular, to a method for displaying splash screen information of an application and an electronic device.

BACKGROUND

Currently, an electronic device such as a mobile phone has become an indispensable communication tool in people's daily life and work. An application (application, APP, hereinafter referred to as an application) is installed in the mobile phone, to improve functions of the mobile phone, and to provide richer use experience for a user. Currently, in addition to in-app payment and paid subscription, a large proportion of commercial monetization modes of many applications are derived from advertisements. For example, some applications have a splash screen function, and a splash screen advertisement slot resource used when these applications are started is one of most valuable advertisement slot resources with highest quality. That is, an advertisement may be presented by using the splash screen advertisement slot resource of the application. For ease of description, an advertisement presented by using the splash screen advertisement slot resource is referred to as a splash screen advertisement below.

As shown in FIG. 1, a process of currently starting most applications that have a splash screen function is as follows: After a mobile phone receives a tap operation performed by a user on an icon of the application or a link of the application in another application, if the application is cold started, the mobile phone first displays a blank screen, then displays a brand slogan (slogan) of the application, then displays a splash screen advertisement, and finally displays a home page of the application. For example, with reference to FIGS. 2a-2d, the application is Toutiao, and the user taps an icon of Toutiao on a desktop to open Toutiao. After the mobile phone receives a tap operation performed by the user on the icon of Toutiao, if Toutiao is cold started, as shown in (a) in FIG. 2, the mobile phone first displays a blank screen 201. There is a very short time for displaying the blank screen 201, and the user may not perceive the blank screen 201. Then, as shown in (b) in FIG. 2, the mobile phone displays a brand slogan 202 of Toutiao. As shown in (c) in FIG. 2, the mobile phone then displays a splash screen advertisement 203. Finally, after display of the splash screen advertisement 203 is completed or the user manually taps to skip splash screen advertisement 203, as shown in (d) in FIG. 2, the mobile phone automatically displays a home page 204 of Toutiao.

Usually, with reference to FIG. 1 and FIGS. 2a-2d, after the user taps the icon of the application or the link of the application, it takes about 500 milliseconds (ms), namely, T1 shown in FIG. 1, to see the brand slogan of the application, and it takes about 1.5-2.5 seconds (s), namely, T2 shown in FIG. 1, to see the splash screen advertisement. The mobile phone presents the home page of the application to the user only after the brand slogan and the splash screen advertisement of the application are presented. It usually takes 3-5 s to present the splash screen advertisement. In this way, after the user taps the icon of the application or the link of the application, it takes at least about 4-5 s for the mobile phone to present the home page of the application to the user for viewing, resulting in relatively poor man-machine interaction performance.

SUMMARY

Embodiments of this application provide a method for displaying splash screen information of an application and an electronic device, to resolve a problem of poor man-machine interaction performance that is caused because it takes a relatively long time to present a page of an application to a user for viewing.

To achieve the foregoing objective, this application uses the following technical solutions.

According to a first aspect, an embodiment of this application provides a method for displaying splash screen information of an application. The method may include: An electronic device receives an operation of opening a first application by a user; the electronic device determines, by using an operating system of the electronic device, that the first application has a splash screen function; and determines, by using the operating system, that a system splash screen capability is enabled for the first application; the electronic device obtains splash screen information of the first application by using the operating system, where the splash screen information may include a brand slogan and/or a splash screen advertisement of the first application; the electronic device loads and renders the splash screen information of the first application by using the operating system; the electronic device displays the splash screen information of the first application; and the electronic device starts the first application, and displays a page of the first application.

According to the method for displaying splash screen information of an application provided in this embodiment of this application, after receiving an operation of opening, by a user, an application that has the splash screen function, a mobile phone may complete processing logic of the splash screen function by using an operating system, that is, load and render splash screen information such as a brand slogan and/or a splash screen advertisement of the application. In this way, based on a processing advantage of the operating system, an effect of the splash screen information can be seen in tens of milliseconds. That is, the splash screen information can be presented in a shorter time, and then a page of the application can be presented, in a shorter time, to the user for viewing. Therefore, man-machine interaction performance and user experience are improved.

In a possible implementation, the operating system of the electronic device may include a launcher, and that an electronic device receives an operation of opening a first application by a user may include: The electronic device receives, by using the launcher, the operation of opening the first application by the user.

In another possible implementation, the operating system of the electronic device may further include a system splash screen management module, the electronic device stores a list, the list includes a package name of an application that does not have the splash screen function, and that the electronic device determines, by using the operating system of the electronic device, that the first application has a splash screen function may include: The electronic device determines, by using the system splash screen management module, that a package name of the first application is not included in the list. In this way, experience of starting the application that does not have the splash screen function is not affected, and compatibility with a procedure of starting the application that does not have the splash screen function is implemented.

In another possible implementation, that the electronic device determines, by using the operating system, that a system splash screen capability is enabled for the first application may include: The electronic device determines, by using the system splash screen management module based on a cached indication indicating whether the system splash screen capability is enabled for the first application, that the system splash screen capability is enabled for the first application. When the system splash screen capability is enabled for the application, if the method in this embodiment is used, that is, processing logic of the splash screen function is completed by using the operating system, compatibility with an existing application start procedure can be implemented.

In another possible implementation, that the electronic device obtains splash screen information of the first application by using the operating system may include: The electronic device obtains the splash screen advertisement from a plurality of cached splash screen advertisements by using the system splash screen management module. The splash screen advertisement that needs to be presented in currently starting the application is selected from the plurality of cached splash screen advertisements. In this way, a rate of successfully presenting the splash screen advertisement can be increased, a loss and waste of traffic used to present the splash screen advertisement are avoided, a click-through rate of the splash screen advertisement is increased, and commercial revenues of the application are increased. Further, a time spent in presenting the splash screen information can be shortened, thereby improving man-machine interaction performance.

In another possible implementation, that the electronic device obtains splash screen information of the first application by using the operating system may include: The electronic device obtains the cached brand slogan of the first application by using the system splash screen management module. In this way, a time spent for presenting the splash screen information can be further shortened, and man-machine interaction performance can be further improved.

In another possible implementation, after the electronic device determines, by using the operating system of the electronic device, that the first application has the splash screen function, the method may further include: The electronic device determines, by using the system splash screen management module, that the first application is cold started.

In another possible implementation, the operating system of the electronic device may further include a system splash screen service module, and the method may further include: The system splash screen management module of the electronic device requests splash screen configuration information of the first application from the system splash screen service module, where the splash screen configuration information of the first application includes the brand slogan of the first application and the indication indicating whether the system splash screen capability is enabled for the first application; the electronic device sends a request message to a splash screen management server by using the system splash screen service module, where the request message is used to request the splash screen configuration information of the first application; the electronic device receives the splash screen configuration information of the first application from the splash screen management server by using the system splash screen service module, or the electronic device receives splash screen configuration information of some or all of applications that are included in the electronic device and that have the splash screen function from the splash screen management server by using the system splash screen service module; and the system splash screen service module of the electronic device updates cached splash screen configuration information of the corresponding application based on the received splash screen configuration information, and synchronizes an updated result to the system splash screen management module. In this way, after the operation of opening the application by the user is received, the splash screen configuration information of the application or the splash screen configuration information of all of the applications that have the splash screen function in the electronic device is asynchronously requested from the splash screen management server, so that the splash screen configuration of the application can be synchronized to a user side in a timely manner when a splash screen configuration of the application is changed, thereby improving timeliness of updating the splash screen configuration of the application.

In another possible implementation, the operating system of the electronic device may further include a splash screen processing module, and that the electronic device starts the first application, and displays a page of the first application includes: The electronic device initializes the first application by using the splash screen processing module, and the electronic device displays the page of the first application after initialization is completed and the splash screen advertisement is presented or an operation of tapping, by the user, to skip the splash screen advertisement is received.

In another possible implementation, the splash screen configuration information of the first application may further include a depth link path of the page of the first application, and that the electronic device displays a page of the first application may include: The electronic device displays the page of the first application based on the deep link path.

In another possible implementation, the method may further include: The system splash screen management module of the electronic device requests a splash screen advertisement from the system splash screen service module; the electronic device sends an advertisement request to the splash screen management server by using the system splash screen service module, where the advertisement request is used to request the splash screen management server to deliver a splash screen advertisement; the electronic device receives advertisement creative information from the splash screen management server by using the system splash screen service module, where the advertisement creative information includes an advertisement download path; and the electronic device downloads a corresponding splash screen advertisement by using the system splash screen service module based on the advertisement downloading path, updates a cache, and synchronizes an updated result to the system splash screen management module. In this embodiment, all of the applications that are installed in the electronic device and that have the splash screen function may share the locally cached splash screen advertisements. In this way, traffic of downloading the splash screen advertisement by the user can be saved, performance of the mobile phone is improved, and power consumption is reduced. In addition, when an operation of opening, by the user, an application that has the splash screen function is received and a system splash screen capability is enabled for the application, a new splash screen advertisement is obtained from the splash screen management server. In this way, the locally cached splash screen advertisements can be updated in a timely manner, and therefore there is a higher hit rate achieved by preloading the splash screen advertisement.

In another possible implementation, that the electronic device receives, by using the launcher, the operation of opening the first application by the user may include: The electronic device receives, by using the launcher, a tap operation performed by the user on a displayed icon of the first application.

In another possible implementation, that the electronic device receives, by using the launcher, the operation of opening the first application by the user may include: The electronic device receives, by using the launcher, a tap operation performed by the user on a link of the first application, where the link of the first application is included on a page of a second application, and the tap operation performed by the user on the link of the first application is used to open the first application, is received by a splash screen processing module of the operating system, and is transmitted by the splash screen processing module to the launcher. In this way, regardless of whether the user opens the application by performing an operation on the icon of the application that is displayed on a desktop or by performing an operation on the link of the application in another application, processing is performed by the launcher of the mobile phone, to ensure consistency of splash screen experience of the application.

According to a second aspect, an embodiment of this application provides an electronic device. The electronic device may include one or more processors, a memory, a display screen, and an input device. The memory is configured to store one or more programs. The one or more processors are configured to run the one or more programs, so that the electronic device performs the method for displaying splash screen information of an application according to any one of the first aspect or the possible implementations of the first aspect.

According to a third aspect, an embodiment of this application provides a computer storage medium. The computer storage medium may include computer instructions. When the computer instructions are run on an electronic device, the electronic device is enabled to perform the input method candidate content recommendation method in any one of the first aspect or the possible implementations of the first aspect.

According to a fourth aspect, an embodiment of this application provides a computer program product. When the computer program product runs on a computer, the computer is enabled to perform the application icon moving method according to any one of the first aspect or the possible implementations of the first aspect.

According to a fifth aspect, an embodiment of this application provides an apparatus. The apparatus has functions of implementing behavior of the electronic device in the method in the first aspect. The function may be implemented by hardware, or may be implemented by hardware executing corresponding software. The hardware or software includes one or more modules corresponding to the function, for example, a display unit or module, an input unit or module, a system splash screen management unit or module, a splash screen processing unit or module, and a system splash screen service unit or module.

It should be understood that descriptions of technical features, technical solutions, beneficial effects, or similar words in this application do not imply that all features and advantages can be implemented in any individual embodiment. On the contrary, it may be understood that descriptions of the features or the beneficial effects mean that at least one embodiment includes a specific technical feature, technical solution, or beneficial effect. Therefore, the descriptions of the technical features, the technical solutions, or the beneficial effects in this specification may not necessarily belong to one embodiment. Further, the technical features, the technical solutions, and the beneficial effects described in the embodiments may be combined in any proper manner. A person skilled in the art understands that an embodiment may be implemented without one or more specific technical features, technical solutions, or beneficial effects in a specific embodiment. In other embodiments, additional technical features and beneficial effects may be further identified in a specific embodiment that does not reflect all the embodiments.

DETAILED DESCRIPTION OF ILLUSTRATIVE EMBODIMENTS

Currently, applications may be installed in an electronic device such as a mobile phone, to provide richer user experience. In the applications installed in the electronic device, some applications such as Amazon, Toutiao, and Twitter (twitter) have a splash screen function. Usually, a procedure of starting the application that has the splash screen function is as follows: After the electronic device receives an operation of opening the application by a user, if the application is cold started, the electronic device first displays a brand slogan and/or a splash screen advertisement of the application, and the electronic device displays a home page of the application after displaying the information.

The operation of opening the application by the user may be a tap operation performed by the user on an icon of the application that is displayed on a desktop (or referred to as a home screen (home screen)) or a tap operation performed by the user on a link of the application in another application.

Cold start may mean that if the application is not run in background, after the electronic device receives the operation of opening the application by the user, the electronic device starts the application in response to the operation. This start manner may be referred to as cold start. A start manner corresponding to cold start may be referred to as hot start. Hot start may mean that if the application is run in background, after the electronic device receives the operation of opening the application by the user, the electronic device starts the application in response to the operation. This start manner is referred to as hot start. Usually, after the operation of opening, by the user, the application that has the splash screen function is received, if the application is cold started, the brand slogan and/or the splash screen advertisement of the application are/is first displayed, and then the page of the application is displayed. If the application is hot started, a page displayed when the application exits last time is directly displayed.

Figure 1:
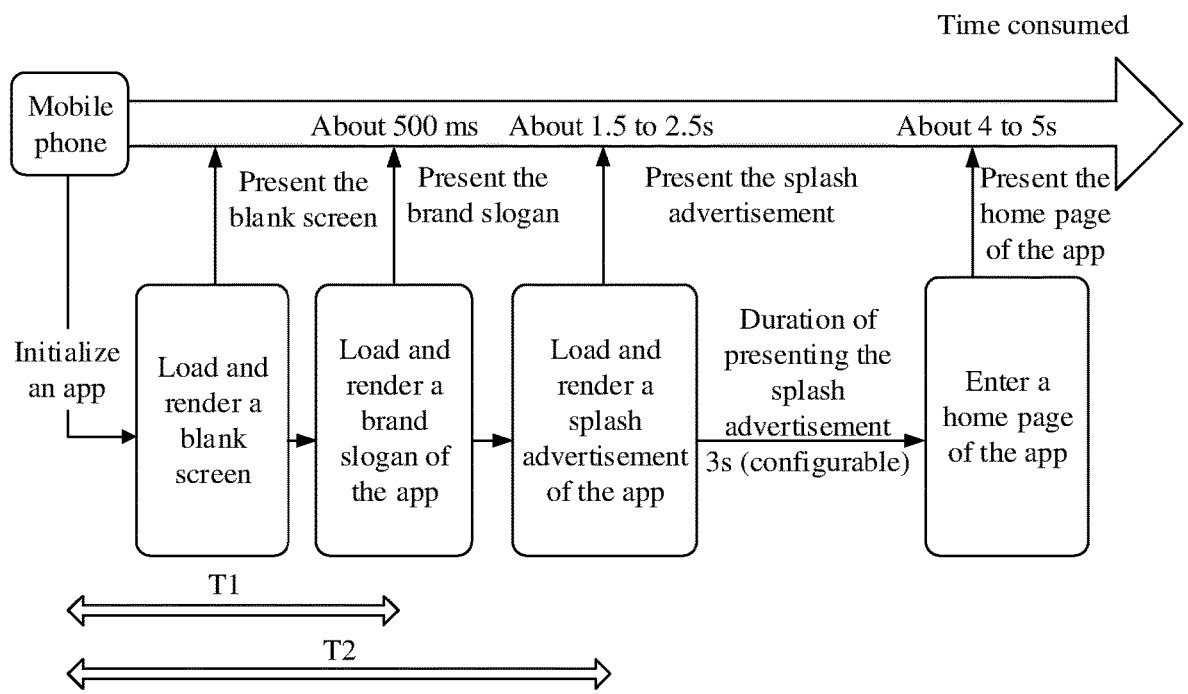
FIG. 1 is a simplified schematic diagram of an application start procedure in the conventional technology.
Figure 2A:
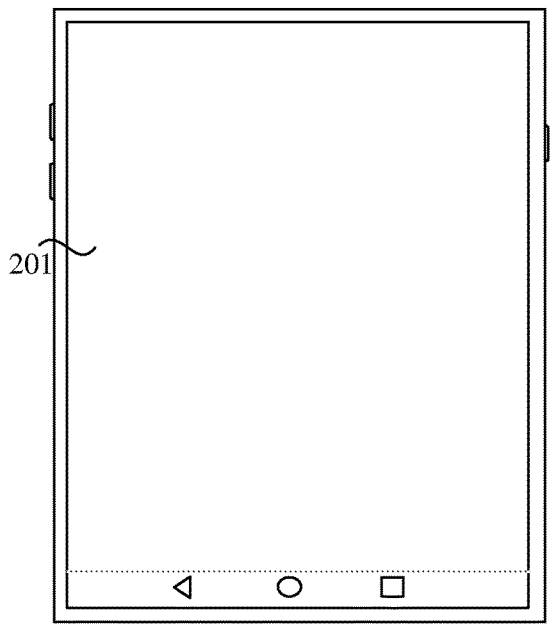
FIGS. 2(a)-2(d) are schematic diagrams of an application start interface in the conventional technology.
Figure 2B:
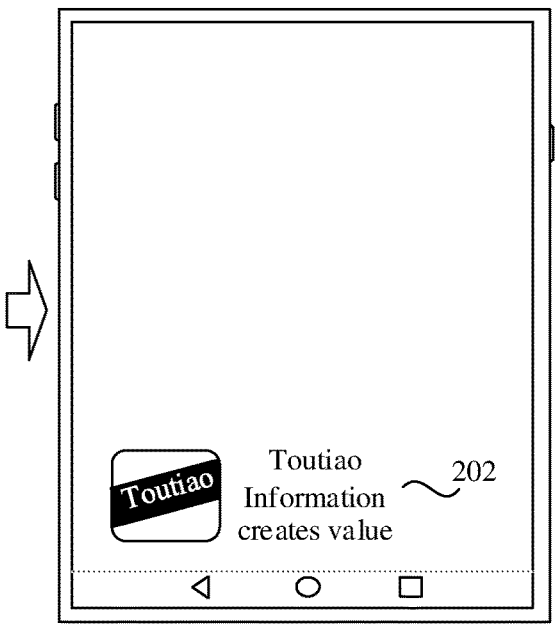
Figure 2D:
Figure 2C:
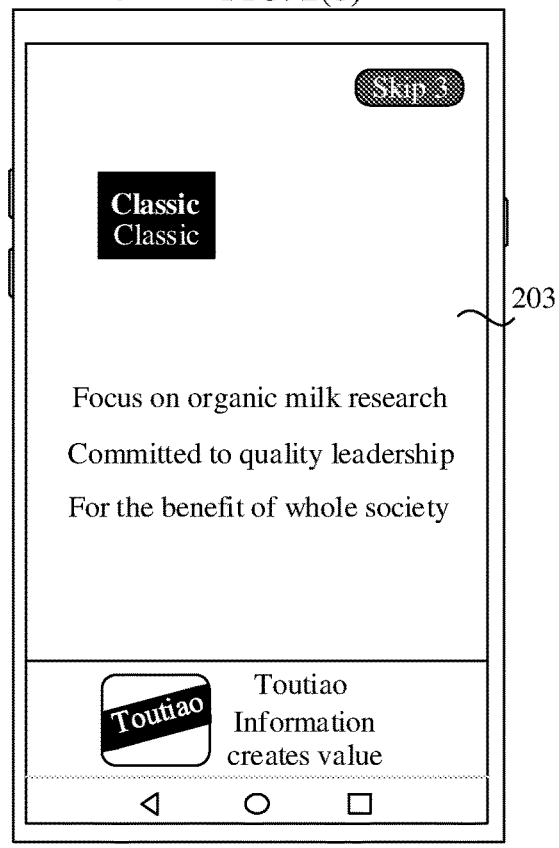
Figure 3:
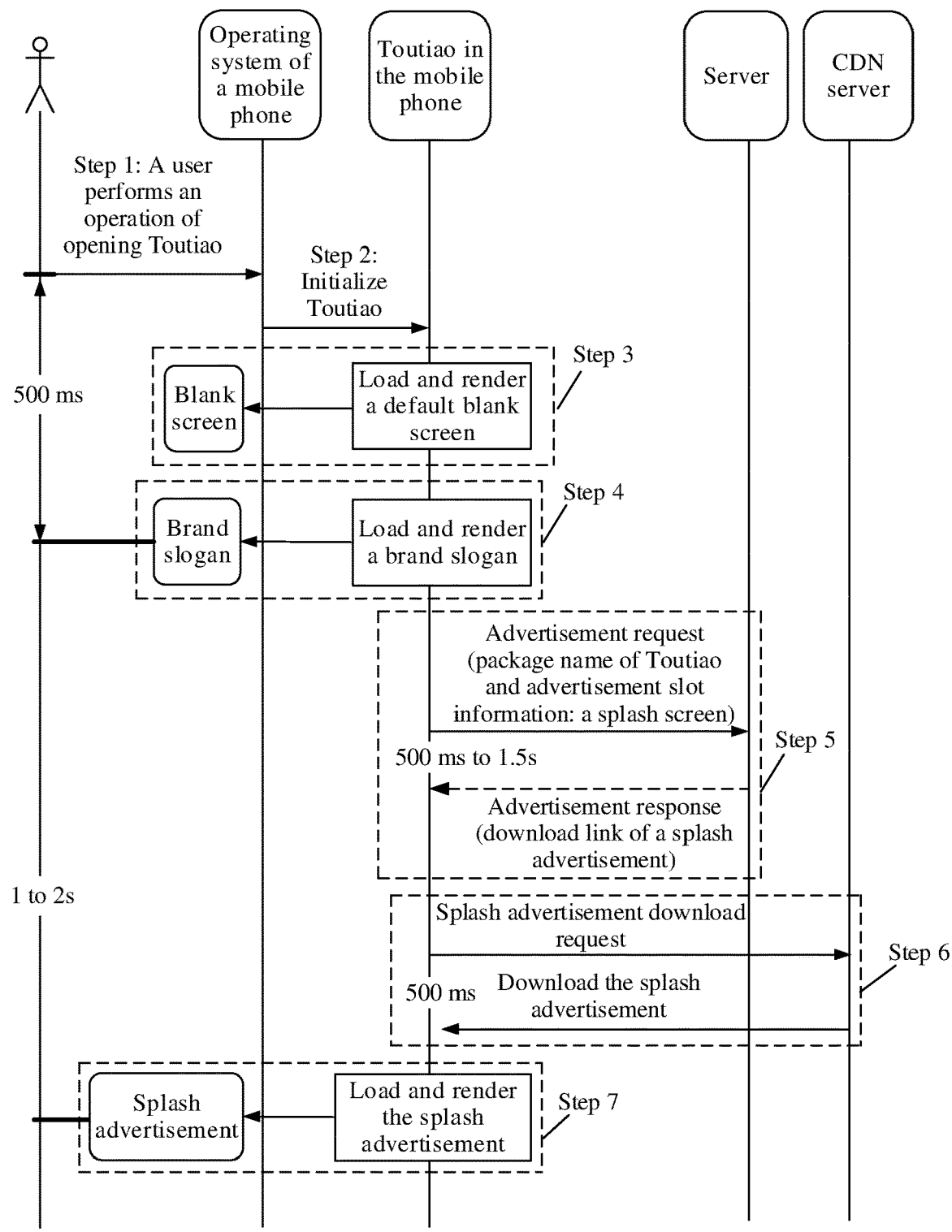
FIG. 3 is another simplified schematic diagram of an application start procedure in the conventional technology.

With reference to FIG. 1 and FIGS. 2a-2d, as shown in FIG. 3, the following briefly describes, by using an example in which the electronic device is a mobile phone and the application is Toutiao, a procedure, in the conventional technology, in which the mobile phone starts Toutiao after an operation of opening Toutiao by a user is received and if Toutiao is cold started.

Step 1: An operating system of the mobile phone receives the operation of opening Toutiao by the user.

Step 2: The operating system of the mobile phone may prepare, in background based on the operation performed by the user, a resource required for initializing Toutiao, and initialize Toutiao by using the resource, to start Toutiao.

Step 3: After the mobile phone starts Toutiao, Toutiao may load and render a default blank screen, and the default blank screen is displayed by the operating system, as shown in (a) in FIG. 2. The blank screen may be used as an identifier for transition from a desktop or a page of another application to Toutiao. After the user performs the operation of enabling Toutiao, it takes about 100-200 ms to see the blank screen.

Step 4: After initialization of Toutiao is completed, if an application brand slogan needs to be presented for Toutiao, the brand slogan of Toutiao needs to be loaded and rendered, and is displayed by the operating system, as shown in (b) in FIG. 2. After the user sees the blank screen, it takes about 300-500 ms to see the brand slogan of Toutiao. That is, after the user performs the operation of opening Toutiao, it takes about 500 ms to see the brand slogan of Toutiao.

Step 5: If there is a splash screen advertisement slot resource for Toutiao, that is, if a splash screen advertisement needs to be presented, when the brand slogan of Toutiao is loaded and rendered, an advertisement request needs to be sent, in most scenarios, to a server deployed on a cloud side, to request the splash screen advertisement. For example, the advertisement request may include a package name and advertisement slot information, namely, a splash screen, of Toutiao. The server predicts and ranks a bidding result based on an advertising schedule/a personalized protocol conformance test report (protocol conformance test report, pCTR), may determine, in real time, creative content to be presented in the splash screen advertisement on a mobile phone side, and returns an advertisement response to the mobile phone. The advertisement response may include at least a download link of the splash screen advertisement. In this way, a splash screen advertisement that is expired or removed can be avoided.

It takes about 500-1500 ms for the server to determine, in real time, the creative content to be presented in the splash screen advertisement. A time consumed depends on a network condition, performance of the server, and a load status. Certainly, it is not necessary to request the splash screen advertisement from the server each time there is a splash screen advertisement presentation request, and a plurality of splash screen advertisements may be obtained when the splash screen advertisement is previously requested. When there is the splash screen advertisement presentation request in a short subsequent period of time, a splash screen advertisement may be selected from the plurality of splash screen advertisements and presented to the user. If the time period of time expires, the splash screen advertisement needs to be requested from the server in real time.

Step 6: If the server returns the download link of the splash screen advertisement in step 5, in most scenarios, the splash screen advertisement further needs to be downloaded from a content distribution network (content distribution network, CDN) server in real time. It takes about 500 ms to download the splash screen advertisement from the CDN server. Certainly, the splash screen advertisement may be preloaded to the application about 1-3 days in advance. However, most applications are opened by the user for a relatively small quantity of times each day. It is found through verification that a hit rate achieved by preloading the splash screen advertisement is about 10%, which is very low. That is, 90% of splash screen advertisements need to be downloaded from the CDN server in real time.

Step 7: Toutiao loads and renders the splash screen advertisement, and the splash screen advertisement is displayed by the operating system, as shown in (c) in FIG. 2. After the user sees the brand slogan of Toutiao, it takes about 1-2 s to see the splash screen advertisement. Duration of presenting the splash screen advertisement may be 3-5 s, and is configurable.

After the user manually taps to skip the splash screen advertisement or waits for about 3-5 s until the splash screen advertisement is presented, the mobile phone may display a home page of Toutiao, as shown in (d) in FIG. 2. Therefore, Toutiao is started.

Before the home page of Toutiao is displayed, processing logic of a splash screen function, namely, step 3 to step 7, is performed after the operating system of the mobile phone starts Toutiao, and is internally implemented by Toutiao.

It may be learned that it takes at least about 4-5 s for the mobile phone to present the page of the application to the user for viewing, resulting in poor man-machine interaction performance. In addition, for the splash screen advertisement, there is a phenomenon of a download timeout or a download failure due to network quality (for example, a poor network signal or limited network congestion bandwidth), the performance of the server, or the like. In this way, there is a high probability that presentation of the splash screen advertisement by the mobile phone ends with a failure. Consequently, a rate of successfully presenting the splash screen advertisement is reduced, and a loss and waste of traffic used to present the splash screen advertisement are caused.

To resolve the foregoing problem, the embodiments of this application provide a method for displaying splash screen information of an application. The method may be applied to an electronic device that includes an application. The application in the electronic device includes an application that has a splash screen function. In the method provided in the embodiments of this application, after receiving an operation of opening the application that has the splash screen function by a user, the electronic device may complete processing logic of the splash screen function by using an operating system. In this way, splash screen information can be presented in a shorter time, and then a page of the application can be presented, in a shorter time, to the user for viewing. Therefore, man-machine interaction performance and user experience are improved. In addition, according to the method provided in the embodiments of this application, a rate of successfully presenting the splash screen advertisement can be improved, and a loss and waste of traffic used to present the splash screen advertisement are avoided.

For example, in the embodiments of this application, a process in which the processing logic of the splash screen function is completed by using the operating system in this embodiment may be referred to as a system splash screen, and a process in which processing logic of a splash screen function is internally completed by an application in the conventional technology may be referred to as a non-system splash screen.

In addition, it should be noted that in the embodiments of this application, the splash screen information may include a brand slogan and/or a splash screen advertisement of the application. The splash screen advertisement may be an advertisement presented by using a splash screen advertisement slot resource of the application. The application that has the splash screen function may be an embedded application (namely, a system application of the electronic device) or a downloadable application. The embedded application is an application program provided as a part of implementation of the electronic device 101. The downloadable application is an application that may provide an internet protocol multimedia subsystem (internet protocol multimedia subsystem, IMS) connection of the downloadable application. The downloadable application may be an application preinstalled in the electronic device, or may be a third-party application that is downloaded by the user and that is installed by the user in the electronic device. Certainly, in the embodiments, the application in the electronic device may further include an application that does not have the splash screen function. The application that does not have the splash screen function may be an embedded application or a downloadable application.

The following describes implementations of the embodiments of this application in detail with reference to the accompanying drawings.

Figure 4:
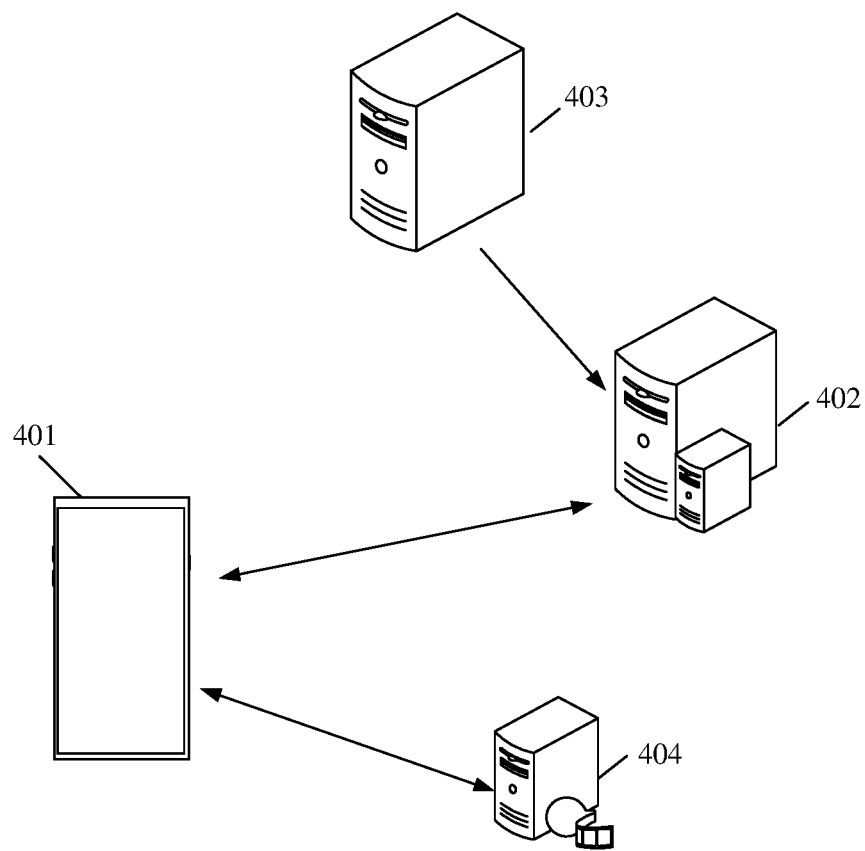
FIG. 4 is a simplified schematic diagram of a system architecture according to an embodiment of this application.

FIG. 4 is a simplified schematic diagram of a system architecture according to an embodiment of this application. As shown in FIG. 4, the system architecture may include at least an electronic device 401 and a splash screen (splash) management server 402.

An application that has a splash screen function may be installed in the electronic device 401. When the electronic device 401 receives an operation of opening, by a user, the application that has the splash screen function, the electronic device 401 may complete processing logic of the splash screen function by using an operating system of the electronic device 401, to present splash screen information to the user. The splash screen information may include a brand slogan and/or a splash screen advertisement of the application.

For example, in some embodiments, when the processing logic of the splash screen function is completed by using the operating system for all applications, after receiving the operation of opening, by the user, the application that has the splash screen function, the electronic device 401 may present the brand slogan of the application to the user by using an operating system of the electronic device 401 based on locally cached splash screen configuration information of the application. The splash screen configuration information of the application may include the brand slogan of the application. The splash screen configuration information may be locally cached when the application is started for the first time, or may be locally cached when another application that has a splash screen function in the electronic device 401 is started for the first time. In addition, when the application or the another application that has a splash screen function is subsequently started, the locally cached splash screen configuration information of the application may further be dynamically updated. In some other embodiments, the electronic device 401 may select an appropriate splash screen advertisement from locally cached splash screen advertisements, and present the splash screen advertisement to the user by using the operating system of the electronic device 401. In some other embodiments, the electronic device 401 may present the brand slogan and the splash screen advertisement of the application to the user by using the operating system of the electronic device 401.

In some other embodiments, when the processing logic of the splash screen function is completed by using the operating system for some applications, and the processing logic of the splash screen function is internally completed by some applications for the applications, that is, some applications have a system splash screen capability, and some applications do not have the system splash screen capability, the splash screen configuration information of the application may further include an indication indicating whether the system splash screen capability is enabled for the application. After receiving the operation of opening the application by the user, the electronic device 401 may first determine, based on the splash screen configuration information of the application, whether the system splash screen capability is enabled for the application. If the system splash screen capability is enabled for the application, a system splash screen may be implemented. That is, the processing logic of the splash screen function is completed by using the operating system of the electronic device 401, to present the splash screen information to the user. If the system splash screen capability is not enabled for the application, a non-system splash screen may be implemented. That is, the processing logic of the splash screen function is internally completed by the application. For example, the splash screen information is presented to the user based on the procedure shown in FIG. 3.

The splash screen configuration information of the application may further include a deep link (deeplink) path of a page (for example, a home page) of the application. After an operation of selecting, by the user, to skip the splash screen advertisement is received or presentation of the splash screen advertisement is completed, the electronic device 401 may automatically display the page, for example, the home page, of the application, based on the locally cached splash screen configuration information of the application.

In addition, after receiving the operation of opening the application by the user, the electronic device 401 may further asynchronously obtain the splash screen configuration information of the application from the splash screen management server 402. The electronic device 401 may further asynchronously send, to the splash screen management server 402, an advertisement request used to request the splash screen advertisement, to obtain appropriate advertisement creative information. The advertisement creative information may include a download path of the splash screen advertisement. The electronic device 401 then obtains the splash screen advertisement by using the download path in the advertisement creative information. The electronic device 401 may update, based on the obtained splash screen configuration information and splash screen advertisement of the application, corresponding information locally cached, to facilitate subsequent use. For example, after receiving the operation of opening the application by the user again, the electronic device 401 determines, based on the locally cached splash screen configuration information of the application, whether the system splash screen capability is enabled for the application.

For example, the electronic device 401 in this embodiment of this application may be a device that includes an application that has the splash screen function, for example, a mobile phone, a tablet computer, a desktop computer, a laptop computer, a handheld computer, a notebook computer, a personal computer (personal computer, PC), a netbook, a cellular phone, a personal digital assistant (personal digital assistant, PDA), a wearable device (for example, a smart watch), a smart household device (for example, an internet protocol television (internet protocol television, IPTV)), a vehicle-mounted computer, a game machine, or an augmented reality (augmented reality, AR)\virtual reality (virtual reality, VR) device. A specific form of the electronic device 401 is not particularly limited in this embodiment. A specific structure of the electronic device 401 may be shown in FIG. 5, and is described in detail in the following embodiments.

The splash screen management server 402 may be configured to implement two parts of functions. A first part of function is to store splash screen configuration information of all applications, and when a request used to request splash screen configuration information of an application is received from the electronic device 401, deliver the splash screen configuration information of the application to the electronic device 401 in real time, or deliver splash screen configuration information of all or some of applications that are installed in the electronic device 401 and that have the splash screen function to the electronic device 401. A second part of function is to process, in real time, an advertisement request that is used to request a splash screen advertisement and that is from the electronic device 401, and return appropriate advertisement creative information to the electronic device 401. The advertisement creative information may include a download path of the splash screen advertisement. The advertisement creative information may further include an identifier (identify, ID) of the splash screen advertisement, a price, a promotion task to which the splash screen advertisement belongs, and the like.

It should be noted that the two parts of functions may be implemented in one server, for example, the splash screen management server 402. Alternatively, the two parts of functions may be implemented in two servers. For example, the first part of function is implemented in a server, for example, a splash screen configuration server, and the second part of function is implemented in another server, for example, a real-time system splash screen server. This is not specifically limited in this embodiment of this application.

Further, the system architecture may include a configuration management server 403.

The configuration management server 403 may provide an open platform for a developer of an application, to provide a differentiated competitive service and an openness capability unique to a vendor. The system splash screen capability is one of openness capabilities. The developer of the application may apply for enabling a system splash screen capability of the application through the open platform, and when applying for enabling the system splash screen capability of the application, configure a parameter required for implementing a system splash screen for the application through the open platform. For example, the developer of the application configures a brand slogan of the application and a deep link path of a default page (for example, a home page), of the application, that is directly entered after splash screen information is presented. The configuration management server 403 may generate corresponding splash screen configuration information for the application based on a configuration by the developer. The splash screen configuration information of the application is valid for all users in an entire network. The splash screen configuration information may include an indication indicating that the system splash screen capability is enabled for the application, the brand slogan of the application, the deep link path of the page of the application, and the like. Certainly, the developer of the application may also apply, through the open platform at anytime, for disabling the system splash screen capability. In addition, the configuration management server 403 may further synchronize the splash screen configuration information of the application to the splash screen management server 402 in real time.

Further, the system architecture may include a CDN server 404.

The CDN server 404 may receive a splash screen advertisement download request from the electronic device 401, and return a corresponding splash screen advertisement to the electronic device 401.

Figure 5:
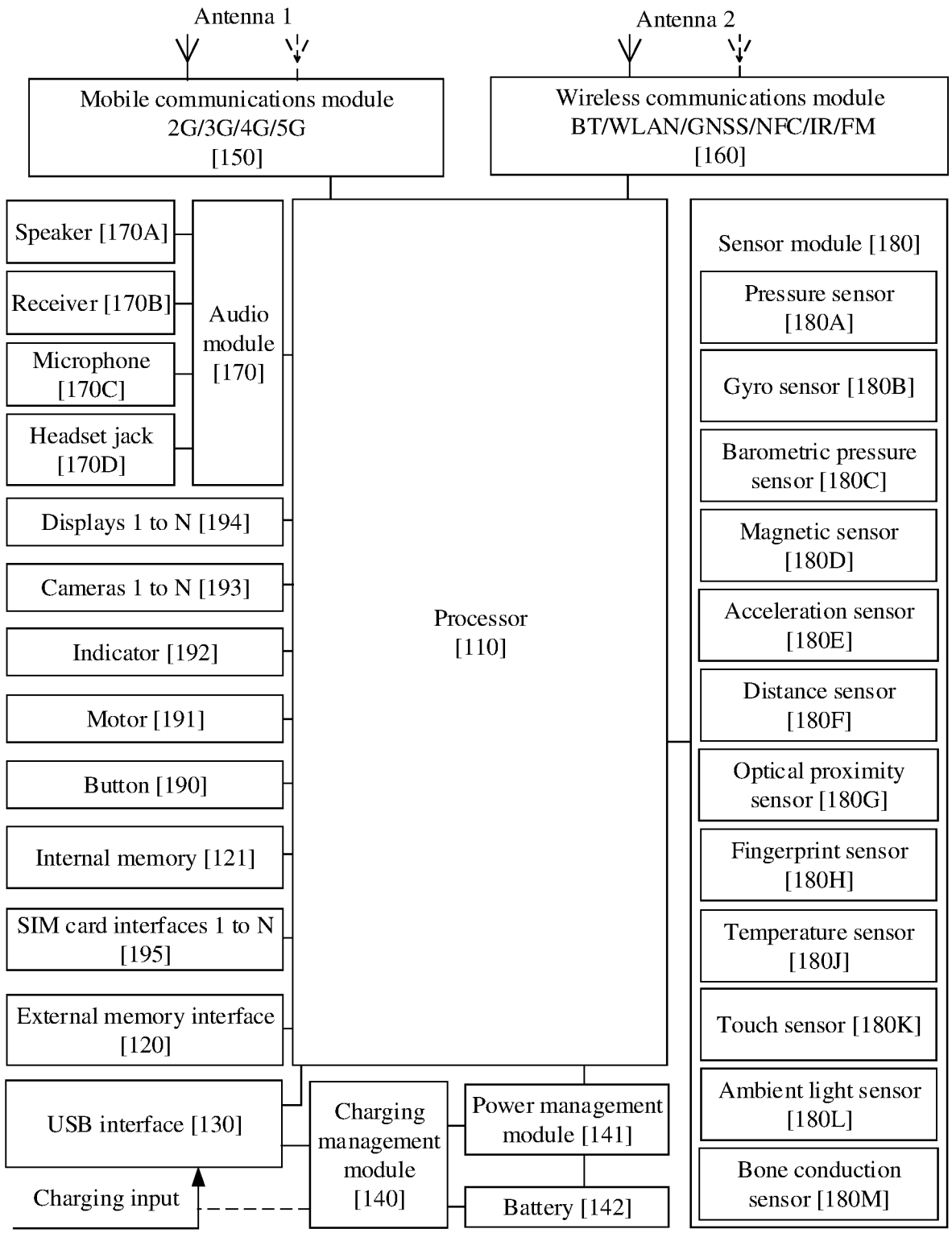
FIG. 5 is a schematic structural diagram of an electronic device according to an embodiment of this application.

FIG. 5 is a schematic diagram of a structure of an electronic device according to an embodiment of this application. As shown in FIG. 5, the electronic device may include a processor 110, an external memory interface 120, an internal memory 121, a universal serial bus (universal serial bus, USB) interface 130, a charging management module 140, a power management module 141, a battery 142, an antenna 1, an antenna 2, a mobile communications module 150, a wireless communications module 160, an audio module 170, a speaker 170A, a receiver 170B, a microphone 170C, a headset jack 170D, a sensor module 180, a button 190, a motor 191, an indicator 192, a camera 193, a display 194, a subscriber identification module (subscriber identification module, SIM) card interface 195, and the like. The sensor module 180 may include a pressure sensor 180A, a gyroscope sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, a touch sensor 180K, an ambient light sensor 180L, a bone conduction sensor 180M, and the like.

It may be understood that the structure shown in this embodiment does not constitute a specific limitation on the electronic device. In some other embodiments, the electronic device may include more or fewer components than those shown in the figure, or some components may be combined, or some components may be split, or different component arrangements may be used. The components shown in the figure may be implemented by using hardware, software, or a combination of software and hardware.

The processor 110 may include one or more processing units. For example, the processor 110 may include an application processor (application processor, AP), a modem processor, a graphics processing unit (graphics processing unit, GPU), an image signal processor (image signal processor, ISP), a controller, a memory, a video codec, a digital signal processor (digital signal processor, DSP), a baseband processor, and/or a neural-network processing unit (neural-network processing unit, NPU). Different processing units may be independent components, or may be integrated into one or more processors.

The controller may be a nerve center and a command center of the electronic device. The controller may generate an operation control signal based on instruction operation code and a time sequence signal, to complete control of instruction fetching and instruction execution.

A memory may be further disposed in the processor 110, and is configured to store an instruction and data. In some embodiments, the memory in the processor 110 is a cache. The memory may store an instruction or data that has been used or is cyclically used by the processor 110. If the processor 110 needs to use the instructions or the data again, the instructions or the data may be invoked directly from the memory. This avoids repeated access and reduces a waiting time of the processor 110, thereby improving efficiency of the system.

In some embodiments, the processor 110 may include one or more interfaces. The interface may include an integrated circuit (inter-integrated circuit, I2C) interface, an inter-integrated circuit sound (inter-integrated circuit sound, I2S) interface, a pulse code modulation (pulse code modulation, PCM) interface, a universal asynchronous receiver/transmitter (universal asynchronous receiver/transmitter, UART) interface, a mobile industry processor interface (mobile industry processor interface, MIPI), a general-purpose input/output (general-purpose input/output, GPIO) interface, a subscriber identity module (subscriber identity module, SIM) interface, a universal serial bus (universal serial bus, USB) interface, and/or the like.

The charging management module 140 is configured to receive a charging input from the charger. The charger may be a wireless charger or a wired charger. In some embodiments of wired charging, the charging management module 140 may receive a charging input from a wired charger through the USB port 130. In some embodiments of wireless charging, the charging management module 140 may receive a wireless charging input through a wireless charging coil of the electronic device. The charging management module 140 may further supply power to the electronic device by using the power management module 141 while charging the battery 142.

The power management module 141 is configured to connect the battery 142 and the charging management module 140 to the processor 110. The power management module 141 receives an input of the battery 142 and/or the charging management module 140, and supplies power to the processor 110, the internal memory 121, an external memory, the display 194, the camera module 193, the wireless communications module 160, and the like. The power management module 141 may be further configured to monitor parameters such as a battery capacity, a battery cycle count, and a battery state of health (electric leakage and impedance). In some other embodiments, the power management module 141 may alternatively be disposed in the processor 110. In some other embodiments, the power management module 141 and the charging management module 140 may alternatively be disposed in a same device.

A wireless communication function of the electronic device may be implemented through the antenna 1, the antenna 2, the mobile communications module 150, the wireless communications module 160, the modem processor, the baseband processor, and the like.

The antenna 1 and the antenna 2 are configured to transmit and receive electromagnetic wave signals. Each antenna of the electronic device may be configured to cover one or more communication frequency bands. Different antennas may be further multiplexed, to improve antenna utilization. For example, the antenna 1 may be multiplexed as a diversity antenna in a wireless local area network. In some other embodiments, the antenna may be used in combination with a tuning switch.

The mobile communications module 150 may provide a solution that is for wireless communication including 2G/3G/4G/5G and the like and that is applied to the electronic device. The mobile communications module 150 may include at least one filter, a switch, a power amplifier, a low noise amplifier (low noise amplifier, LNA), and the like. The mobile communications module 150 may receive an electromagnetic wave through the antenna 1, perform processing such as filtering and amplification on the received electromagnetic wave, and transmit a processed electromagnetic wave to the modem processor for demodulation. The mobile communications module 150 may further amplify a signal modulated by the modem processor, and convert the signal into an electromagnetic wave by using the antenna 1 for radiation. For example, in this embodiment of this application, the electronic device may send request information used to obtain splash screen configuration information of an application to a splash screen management server by using the mobile communications module 150, and receive the splash screen configuration information returned by the splash screen management server. The electronic device may further send an advertisement request used to request a splash screen advertisement to the splash screen management server by using the mobile communications module 150, and receive advertisement creative information from the splash screen management server. The electronic device may further send a splash screen advertisement download request to a CDN server by using the mobile communications module 150, receive a splash screen advertisement from the CDN server, and so on. In some embodiments, at least some function modules of the mobile communications module 150 may be disposed in the processor 110. In some embodiments, at least some function modules of the mobile communications module 150 and at least some modules of the processor 110 may be disposed in a same device.

The modem processor may include a modulator and a demodulator. The modulator is configured to modulate a to-be-sent low-frequency baseband signal into a medium or high-frequency signal. The demodulator is configured to demodulate a received electromagnetic wave signal into a low-frequency baseband signal. Then, the demodulator transmits the low-frequency baseband signal obtained through demodulation to the baseband processor for processing. The low-frequency baseband signal is processed by the baseband processor, and then a processed low-frequency baseband signal is transferred to the application processor. The application processor outputs a sound signal over an audio device (which is not limited to the speaker 170A, the telephone receiver 170B, and the like), or displays an image or a video over the display screen 194. In some embodiments, the modem processor may be an independent component. In some other embodiments, the modem processor may be independent of the processor 110, and is disposed in a same device with the mobile communication module 150 or another function module.

The wireless communications module 160 may provide wireless communication solutions, applied to the electronic device, for example, a wireless local area network (wireless local area networks, WLAN) (such as a wireless fidelity (wireless fidelity, Wi-Fi) network), Bluetooth (bluetooth, BT), a global navigation satellite system (global navigation satellite system, GNSS), frequency modulation (frequency modulation, FM), near field communication (near field communication, NFC), and infrared (infrared, IR) technologies. The wireless communications module 160 may be one or more components integrating at least one communications processing module. The wireless communications module 160 receives an electromagnetic wave through the antenna 2, performs frequency modulation and filtering processing on an electromagnetic wave signal, and sends a processed signal to the processor 110. The wireless communications module 160 may further receive a to-be-sent signal from the processor 110, perform frequency modulation and amplification on the signal, and convert a processed signal into an electromagnetic wave through the antenna 2 for radiation.

In some embodiments, the antenna 1 of the electronic device is coupled to the mobile communications module 150, and the antenna 2 is coupled to the wireless communications module 160, so that the electronic device may communicate with a network and another device by using a wireless communications technology. The wireless communications technology may include global system for mobile communications (global system for mobile communications, GSM), general packet radio service (general packet radio service, GPRS), code division multiple access (code division multiple access, CDMA), wideband code division multiple access (wideband code division multiple access, WCDMA), time-division code division multiple access (time-division code division multiple access, TD-SCDMA), long term evolution (long term evolution, LTE), BT, GNSS, WLAN, NFC, FM, and/or IR technologies. The GNSS may include a global positioning system (global positioning system, GPS), a global navigation satellite system (global navigation satellite system, GLONASS), a BeiDou navigation satellite system (beidou navigation satellite system, BDS), a quasi-zenith satellite system (quasi-zenith satellite system, QZSS) and/or a satellite based augmentation system (satellite based augmentation systems, SBAS).

The electronic device implements a display function through the GPU, the display 194, the application processor, and the like. The GPU is a microprocessor for image processing, and is connected to the display 194 and the application processor. The GPU is configured to: perform mathematical and geometric calculation, and render an image. The processor 110 may include one or more GPUs, which execute a program instruction to generate or change display information.

The display 194 is configured to display an image, a video, and the like. The display 194 includes a display panel. The display panel may be a liquid crystal display (liquid crystal display, LCD), an organic light-emitting diode (organic light-emitting diode, OLED), an active-matrix organic light emitting diode (active-matrix organic light emitting diode, AMOLED), a flexible light-emitting diode (flex light-emitting diode, FLED), a mini-LED, a micro-LED, a micro-OLED, a quantum dot light emitting diode (quantum dot light emitting diodes, QLED), or the like. In some embodiments, the electronic device may include one or N displays 194, where N is a positive integer greater than 1. For example, in this embodiment of this application, the display screen 194 may be configured to display splash screen information, including a brand slogan and/or a splash screen advertisement.

The electronic device may implement a photographing function through the ISP, the camera 193, the video codec, the GPU, the display 194, the application processor, and the like.

The ISP is configured to process data fed back by the camera 193. For example, during shooting, a shutter is pressed, light is transmitted to a photosensitive element of the camera through a lens, an optical signal is converted into an electrical signal, and the photosensitive element of the camera transmits the electrical signal to the ISP for processing, to convert the electrical signal into a visible image. The ISP may further perform algorithm optimization on noise, brightness, and complexion of the image. The ISP may further optimize parameters such as exposure and color temperature of a photographing scenario. In some embodiments, the ISP may be disposed in the camera 193.

The camera 193 is configured to capture a static image or a video. An optical image of an object is generated by using the lens, and is projected onto the photosensitive element. The light-sensitive element may be a charge coupled device (charge coupled device, CCD) or a complementary metal-oxide-semiconductor (complementary metal-oxide-semiconductor, CMOS) phototransistor. The photosensitive element converts the optical signal into an electrical signal, and then transfers the electrical signal to the ISP for conversion into a digital image signal. The ISP outputs the digital image signal to the DSP for processing. The DSP converts the digital image signal into an image signal in a standard format such as RGB or YUV. In some embodiments, the electronic device may include one or N cameras 193, where N is a positive integer greater than 1.

The digital signal processor is configured to process a digital signal, and may process another digital signal in addition to a digital image signal. For example, when the electronic device selects a frequency channel number, the digital signal processor is configured to perform Fourier Transform on energy of the frequency channel number.

The video codec is configured to compress or decompress a digital video. The electronic device may support one or more video codecs. In this way, the electronic device may play or record videos in a plurality of coding formats, for example, moving picture experts group (moving picture experts group, MPEG)-1, MPEG-2, MPEG-3, and MPEG-4.

The NPU is a neural-network (neural-network, NN) computing processor. The NPU quickly processes input information with reference to a structure of a biological neural network, for example, a transfer mode between human brain neurons, and may further continuously perform self-learning. An application such as intelligent cognition, for example, image recognition, facial recognition, speech recognition, or text understanding of the electronic device may be implemented by using the NPU.

The external memory interface 120 may be configured to connect to an external memory card, for example, a micro SD card, to extend a storage capability of the electronic device. The external storage card communicates with the processor no by using the external memory interface 120, to implement a data storage function. For example, files such as music and a video are stored in the external memory card.

The internal memory 121 may be configured to store computer executable program code, and the executable program code includes an instruction. The processor no runs the instruction stored in the internal memory 121, to perform various function applications and data processing of the electronic device. For example, in this embodiment of this application, the processor no may execute the instructions stored in the internal memory 121, and when receiving an operation of opening, by a user, an application that has a splash screen function, in response to the operation, display splash screen information, and display a page, for example, a home page, of the application. The internal memory 121 may include a program storage area and a data storage area. The program storage area may store an operating system, an application required by at least one function (for example, a sound playing function or an image playing function), and the like. The data storage area may store data (such as audio data and a phone book) created when the electronic device is used, and the like. In addition, the internal memory 121 may include a high-speed random access memory, and may further include a non-volatile memory such as at least one magnetic disk storage device, a flash memory, or a universal flash storage (universal flash storage, UFS).

The electronic device 10 may implement audio functions by using the audio module 170, the speaker 170A, the receiver 170B, the microphone 170C, the headset jack 170D, the application processor, and the like.

The audio module 170 is configured to convert digital audio information into an analog audio signal for output, and is also configured to convert an analog audio input into a digital audio signal. The audio module 170 may be further configured to code and decode an audio signal. In some embodiments, the audio module 170 may be disposed in the processor 110, or some function modules of the audio module 170 are disposed in the processor 110.

The speaker 170A, also referred to as a "horn", is configured to convert an audio electrical signal into a sound signal. The electronic device may listen to music or answer a hands-free call through the speaker 170A.

The receiver 170B, also referred to as an "earpiece", is configured to convert an audio electrical signal into a sound signal. When a call is answered or voice information is received by using the electronic device, the receiver 170B may be put close to a human ear to receive a voice.

The microphone 170C, also referred to as a "mike" or a "microphone", is configured to convert a sound signal into an electrical signal. When making a call, sending voice information, or needing to trigger, by using a voice assistant, the electronic device to perform some functions, the user may make a sound by putting the mouth close to the microphone 170C, and input a sound signal to the microphone 170C. At least one microphone 170C may be disposed in the electronic device. In some other embodiments, two microphones 170C may be disposed in the electronic device, to implement a noise reduction function, in addition to collecting a sound signal. In some other embodiments, three, four, or more microphones 170C may alternatively be disposed in the electronic device, to collect a sound signal and reduce noise. The microphones may further identify a sound source, to implement a directional recording function, and the like.

The headset jack 170D is configured to connect to a wired headset. The headset jack 170D may be the USB interface 130, or may be a 3.5 mm open mobile terminal platform (open mobile terminal platform, OMTP) standard interface, or a cellular telecommunications industry association of the USA (cellular telecommunications industry association of the USA, CTIA) standard interface.

The pressure sensor 180A is configured to sense a pressure signal, and can convert the pressure signal into an electrical signal. In some embodiments, the pressure sensor 180A may be disposed on the display 194. There are many types of pressure sensors 180A, such as a resistive pressure sensor, an inductive pressure sensor, and a capacitive pressure sensor. The capacitive pressure sensor may include at least two parallel plates made of conductive materials. When a force is applied to the pressure sensor 180A, capacitance between electrodes changes. The electronic device determines strength of pressure based on a change of the capacitance. When a touch operation is performed on the display 194, the electronic device detects strength of the touch operation by using the pressure sensor 180A. The electronic device may further calculate a touch position based on a detection signal of the pressure sensor 180A. In some embodiments, touch operations that are performed at a same touch location but have different touch operation intensity may correspond to different operation instructions. For example, when a touch operation whose touch operation intensity is less than a first pressure threshold is performed on an application icon "Messages", an instruction for viewing an SMS message is executed. When a touch operation whose touch operation intensity is greater than or equal to the first pressure threshold is performed on an application icon "Messages", an instruction for creating an SMS message is executed.

The gyro sensor 180B may be configured to determine a motion posture of the electronic device. In some embodiments, angular velocities of the electronic device around three axes (namely, axes x, y, and z) may be determined by using the gyro sensor 180B. The gyroscope sensor 180B may be configured to implement image stabilization during photographing. For example, when the shutter is pressed, the gyro sensor 180B detects an angle at which the electronic device shakes, and calculates, based on the angle, a distance for which a lens module needs to compensate, so that the lens cancels the shake of the electronic device through reverse motion, to implement image stabilization. The gyroscope sensor 180B may be further used in a navigation scenario and a motion-sensing game scenario.

The barometric pressure sensor 180C is configured to measure barometric pressure. In some embodiments, the electronic device calculates an altitude based on a barometric pressure value measured by the barometric pressure sensor 180C, to assist in positioning and navigation.

The magnetic sensor 180D includes a Hall effect sensor. The electronic device may detect opening and closing of a flip leather case by using the magnetic sensor 180D. In some embodiments, when the electronic device is a clamshell phone, the electronic device may detect opening and closing of a flip cover by using the magnetic sensor 180D. Further, a feature such as automatic unlocking upon opening of the flip cover is set based on a detected opening or closing state of the leather case or a detected opening or closing state of the flip cover.

The acceleration sensor 180E may detect magnitude of accelerations in various directions (usually on three axes) of the electronic device. When the electronic device is still, a value and a direction of gravity may be detected. The acceleration sensor may be further configured to recognize a posture of the electronic device, and is used in screen switching between a landscape mode and a portrait mode, a pedometer, or another application.

The distance sensor 180F is configured to measure a distance. The electronic device may measure the distance in an infrared or a laser manner. In some embodiments, in a photographing scenario, the electronic device may measure a distance by using the distance sensor 180F, to implement quick focusing.

The optical proximity sensor 180G may include a light-emitting diode (LED) and an optical detector, for example, a photodiode. The light-emitting diode may be an infrared light-emitting diode. The electronic device emits infrared light through the light-emitting diode. The electronic device detects infrared reflected light from a nearby object by using the photodiode. When sufficient reflected light is detected, it may be determined that there is an object near the electronic device. When insufficient reflected light is detected, the electronic device may determine that there is no object near the electronic device. The electronic device may detect, by using the optical proximity sensor 180G, that the user holds the electronic device close to an ear for a call, to automatically turn off a screen for power saving. The optical proximity sensor 180G may also be used in a leather case mode or a pocket mode to automatically unlock or lock the screen.

The ambient light sensor 180L is configured to sense ambient light brightness. The electronic device may adaptively adjust brightness of the display 194 based on the sensed ambient light brightness. The ambient light sensor 180L may also be configured to automatically adjust a white balance during photographing. The ambient light sensor 180L may also cooperate with the optical proximity sensor 180G to detect whether the electronic device is in a pocket, to avoid an accidental touch.

The fingerprint sensor 180H is configured to collect a fingerprint. The electronic device may implement, by using a characteristic of an acquired fingerprint, fingerprint unlocking, accessing an application lock, fingerprint photographing, answering an incoming call by using a fingerprint, and the like.

The temperature sensor 180J is configured to detect a temperature. In some embodiments, the electronic device executes a temperature processing policy by using the temperature detected by the temperature sensor 180J. For example, when the temperature reported by the temperature sensor 180J exceeds a threshold, the electronic device degrades performance of a processor near the temperature sensor 180J, to reduce power consumption and implement thermal protection. In some other embodiments, when the temperature is lower than another threshold, the electronic device heats up the battery 142, to avoid abnormal shutdown of the electronic device due to a low temperature. In some other embodiments, when the temperature is lower than still another threshold, the electronic device boosts an output voltage of the battery 142 to avoid abnormal shutdown due to a low temperature.

The touch sensor 180K may also be referred to as a "touch panel". The touch sensor 180K may be disposed on the display 194, and the touch sensor 180K and the display 194 constitute a touchscreen, which is also referred to as a "touchscreen". The touch sensor 180K is configured to detect a touch operation performed on or near the touch sensor 180K. The touch sensor may transfer the detected touch operation to the application processor, to determine a type of a touch event. Visual output related to the touch operation may be provided on the display 194. In some other embodiments, the touch sensor 180K may alternatively be disposed on a surface of the electronic device at a position different from that of the display 194.

The bone conduction sensor 180M may obtain a vibration signal. In some embodiments, the bone conduction sensor 180M may obtain a vibration signal of a vibration bone of a human vocal part. The bone conduction sensor 180M may also be in contact with a human pulse, and receive a blood pressure beating signal. In some embodiments, the bone conduction sensor 180M may also be disposed in the headset, to obtain a bone conduction headset. The audio module 170 may obtain a speech signal through parsing based on the vibration signal that is of the vibration bone of the vocal-cord part and that is obtained by the bone conduction sensor 180M, to implement a speech function. The application processor may parse heart rate information based on the blood pressure beating signal obtained by the bone conduction sensor 180M, to implement a heart rate detection function.

The button 190 includes a power button, a volume button, and the like. The button 190 may be a mechanical button, or may be a touch button. The electronic device may receive a key input, and generate a key signal input related to user settings and function control of the electronic device.

The motor 191 may generate a vibration prompt. The motor 191 may be configured to produce an incoming call vibration prompt and a touch vibration feedback. For example, touch operations performed on different applications (for example, photo taking and audio playing) may correspond to different vibration feedback effects. The motor 191 may also correspond to different vibration feedback effects for touch operations performed on different areas of the display 194. Different application scenarios (for example, a time prompt, information receiving, an alarm clock, and a game) may also correspond to different vibration feedback effects. A touch vibration feedback effect may be further customized.

The indicator 192 may be an indicator light, and may be configured to indicate a charging status and a power change, or may be configured to indicate a message, a missed call, a notification, and the like.

The SIM card interface 195 is used to connect to a SIM card. The SIM card may be inserted in the SIM card interface 195 or removed from the SIM card interface 195, to implement contact with or separation from the electronic device. The electronic device may support one or N SIM card interfaces, and N is a positive integer greater than 1. The SIM card interface 195 can support a nano-SIM card, a micro-SIM card, a SIM card, and the like. A plurality of cards may be simultaneously inserted into a same SIM card interface 195. The plurality of cards may be of a same type or of different types. The SIM card interface 195 is applicable to different types of SIM cards. The SIM card interface 195 is also applicable to an external storage card. The electronic device interacts with a network by using the SIM card, to implement functions such as a call and data communication. In some embodiments, the electronic device uses an eSIM card, namely, an embedded SIM card. The eSIM card may be embedded into the electronic device, and cannot be detached from the electronic device.

All technical solutions in the following embodiments may be implemented in the electronic device 100 that has the foregoing hardware architecture.

A hierarchical architecture, an event-driven architecture, a micro-core architecture, a micro-service architecture, or a cloud architecture may be used for a software system of the electronic device 100. In the embodiments of this application, a software structure of the electronic device is described by using an Android system with a layered architecture as an example.

Figure 6:
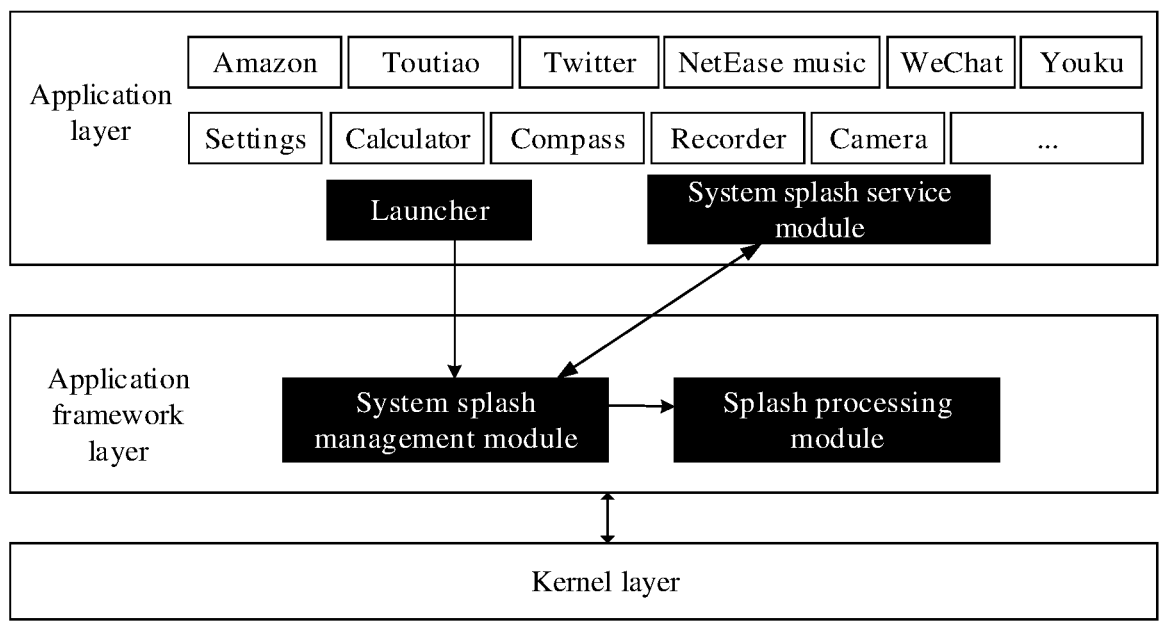
FIG. 6 is a schematic diagram of a software structure of an electronic device according to an embodiment of this application.

FIG. 6 is a block diagram of a software structure of an electronic device according to an embodiment of this application. In a layered architecture, software is divided into several layers, and each layer has a clear role and task. The layers communicate with each other through a software interface. In some embodiments, an Android system is divided into three layers that are an application layer, an application framework layer (framework), and a kernel layer from top to bottom.

The application layer may include a series of application packages. As shown in FIG. 6, the application package may include an application, for example, an application such as Amazon, Toutiao, Twitter, Youku, NetEase music, or WeChat, that has a splash screen function. The application package may further include an application, for example, Settings, Calculator, Compass, Recorder, Camera, Phone, or Messaging, that does not have the splash screen function.

In addition, as shown in FIG. 6, the application layer may further include a launcher. The launcher is a desktop system application of the electronic device, and is a system-level application. In this embodiment, when the electronic device receives a tap operation performed by a user on an icon of an application that is displayed on a desktop and that has the splash screen function, or receives a tap operation performed by a user on a link of an application that has the splash screen function in another application, the launcher may invoke the framework of the electronic device, for example, invoke a system splash screen management module included in the framework of the electronic device, to complete processing logic of the splash screen function by using an operating system, so as to present splash screen information to the user, for example, present an effect of a brand slogan and/or a splash screen advertisement of the application to the user.

The system splash screen management module may also be referred to as a system splash screen manager, and may be a software development kit (software development kit, SDK). The system splash screen management module may be included at the application framework layer (framework). In addition, when the processing logic of the splash screen function is completed by using the operating system, the framework may initialize the application in parallel and directly jump to a corresponding page. For example, the system splash screen management module may indicate a splash screen processing module in the framework of the electronic device in parallel to initialize the application and directly jump to a corresponding page.

In addition, the launcher has no networking capability, and therefore presentation of the splash screen information further requires real-time communication between the system splash screen management module and a system splash screen service module, so that the system splash screen management module obtains data, for example, the brand slogan and/or the splash screen advertisement of the application, required for presenting the splash screen information.

The system splash screen service module may also be referred to as a splash screen (splash) service (Service). The system splash screen service module may be included at the application layer. The system splash screen service module is one of core services of a mobile application service on an electronic device side, may be used as an advertisement engine on the electronic device side, and supports a real-time networking capability. For example, the system splash screen service module may be an advertisement service in Huawei HMS Core APK. In this embodiment, the electronic device may obtain the splash screen configuration information of the application from the splash screen management server 402 by using the system splash screen service module. The splash screen configuration information may include a brand slogan of the application. In addition, when a system splash screen capability is enabled for the application, the electronic device may further obtain advertisement creative information from the splash screen management server 402 by using the system splash screen service module. The advertisement creative information may include a download path of the splash screen advertisement. The electronic device may further download a corresponding splash screen advertisement from the CDN server 404 by using the system splash screen service module based on the download path in the advertisement creative information. In this way, the system splash screen service module may obtain the data (including the brand slogan and/or the splash screen advertisement of the application) required for presenting the splash screen information, so that the system splash screen management module obtains the data, to prepare for presenting the splash screen information when the application is opened next time. It should be noted that cached splash screen advertisements may be shared by all applications in the electronic device.

The application framework layer provides an application programming interface (application programming interface, API) and a programming framework for an application of the application layer. The framework is a base of an operating framework of the electronic device. In this embodiment, the framework may further include the splash screen processing module. The splash screen processing module may be responsible for initializing an application at the application layer when the application is started, and may further directly jump to a corresponding page (for example, a home page of the application) based on invocation by the system splash screen management module. In addition, the framework may be further responsible for providing a mechanism of communication between applications.

The kernel layer is a layer between hardware and software. The kernel layer includes at least a display driver, a camera driver, an audio driver, and a sensor driver.

With reference to the software structure shown in FIG. 6, the following describes in detail the method for displaying splash screen information of an application provided in the embodiments of this application.

In the embodiments of this application, after an electronic device receives an operation of opening, by a user, an application that has a splash screen function, the electronic device may complete processing logic of the splash screen function by using an operating system, to present, in a shorter time, splash screen information to the user and a page of the application to the user for viewing. The splash screen information may include a brand slogan and/or a splash screen advertisement of the application.

Figure 7A:
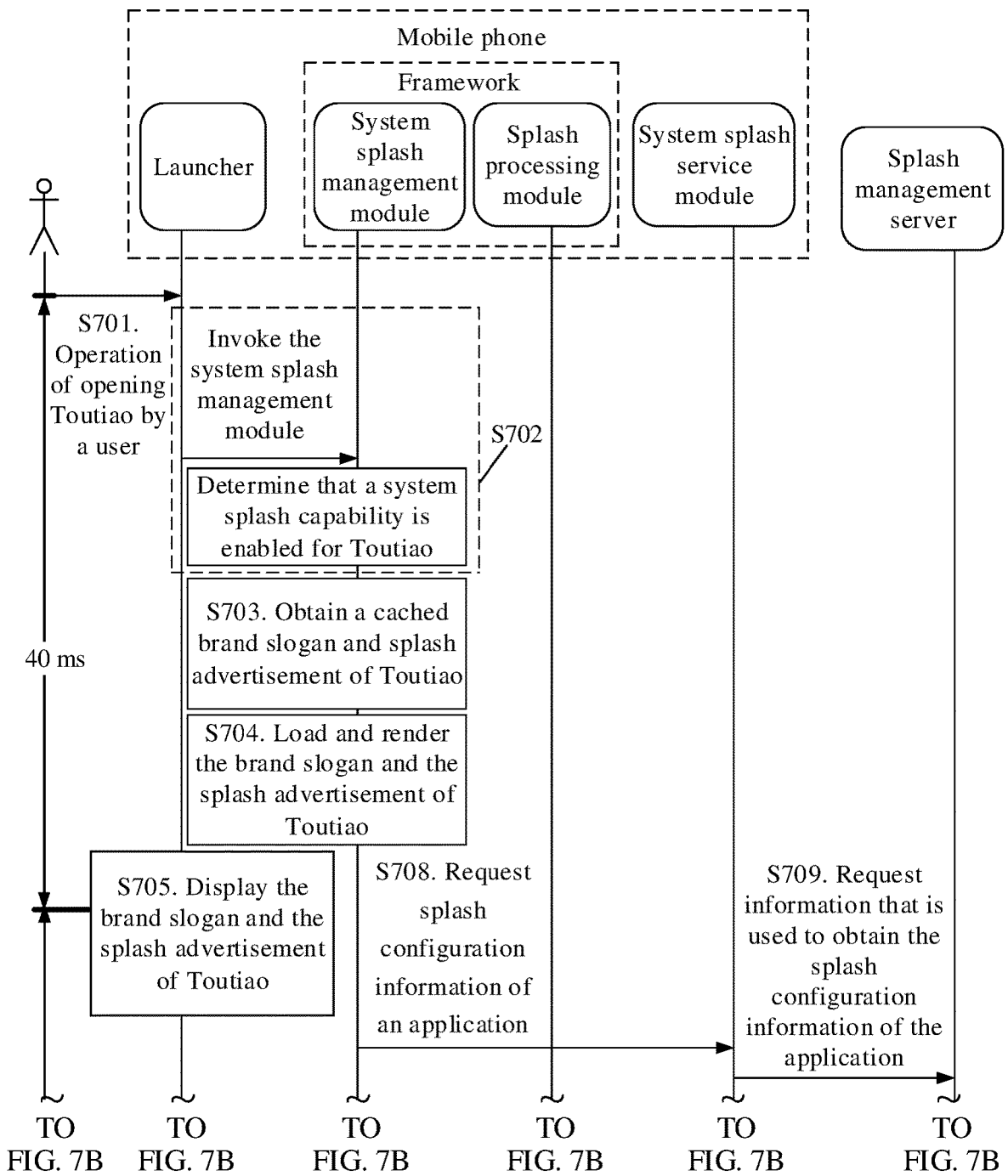
FIG. 7A and FIG. 7B are a schematic flowchart of a method for displaying splash screen information of an application according to an embodiment of this application.
Figure 7B:
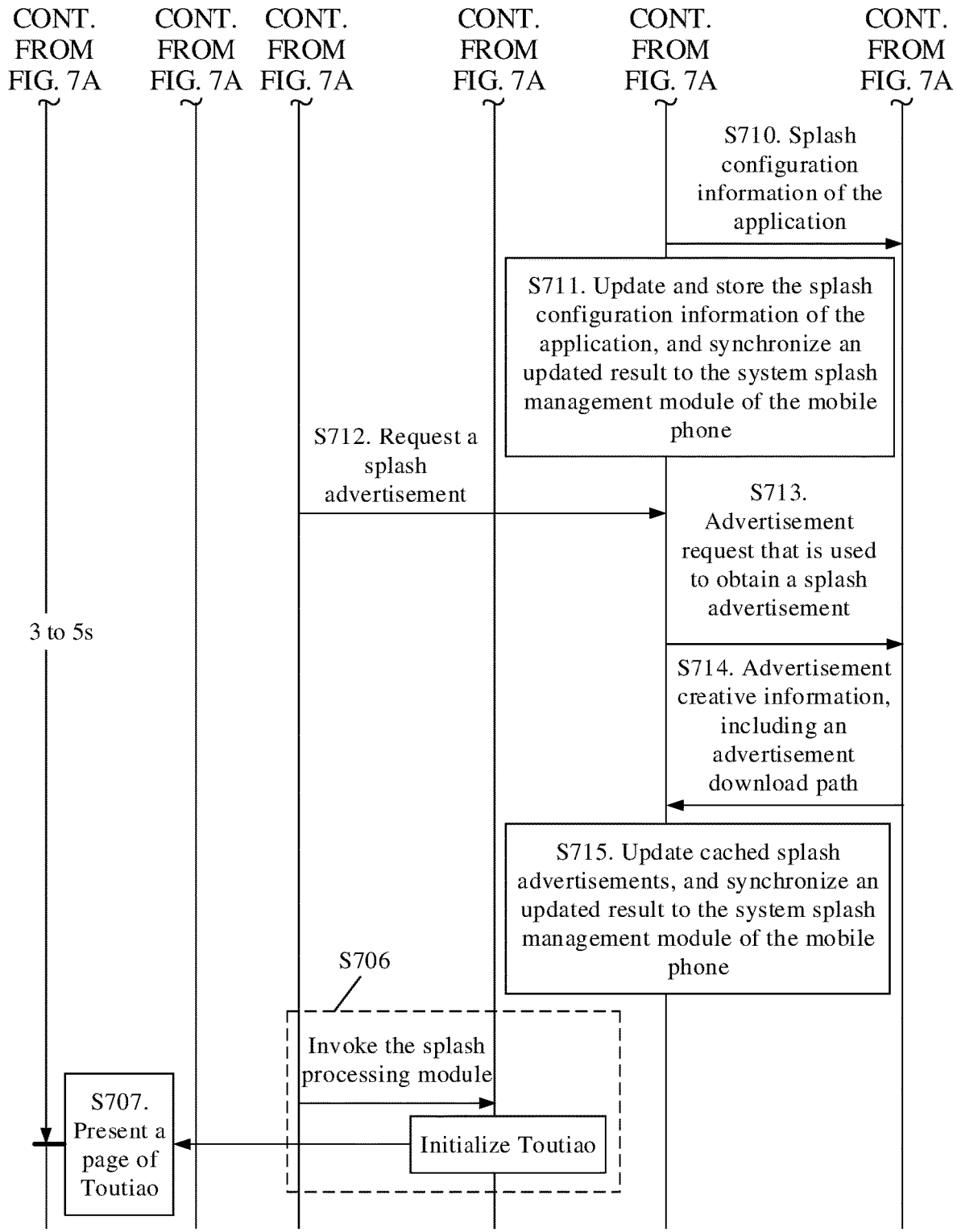

FIG. 7A and FIG. 7B are a schematic flowchart of a method for displaying splash screen information of an application according to an embodiment of this application. In the embodiment shown in FIG. 7A and FIG. 7B, description is provided by using an example in which an electronic device is a mobile phone, an application that has a splash screen function is Toutiao, and splash screen information includes a brand slogan and a splash screen advertisement of the application. As shown in FIG. 7A and FIG. 7B, the method may include the following steps.

S701. A launcher of the mobile phone receives an operation of opening Toutiao by a user.

The mobile phone may display, on a desktop of the mobile phone, icons of applications installed in the mobile phone. For example, if Toutiao is installed in the mobile phone, an icon of Toutiao is displayed on the desktop of the mobile phone. In some embodiments, when the user wants to open Toutiao, the user may perform a tap operation on the icon of Toutiao that is displayed on the desktop. In this case, the mobile phone may receive the tap operation. For example, the launcher of the mobile phone may receive the tap operation. The tap operation is used to open Toutiao.

In some other embodiments, the user may open Toutiao by tapping a link of Toutiao in another application. For example, the mobile phone currently displays an interface of Amazon, and the interface includes the link of Toutiao. The link is a link of opening Toutiao based on a package name, and is not a deep link. When the user wants to open Toutiao, the user may perform a tap operation on the link of Toutiao on the interface of Amazon interface. In this case, the mobile phone may receive the tap operation. The tap operation is used to open Toutiao. For example, specifically, an operating system of the mobile phone, for example, a framework (for example, a splash screen processing module) may receive the tap operation. In addition, the framework (for example, the splash screen processing module) may determine that the tap operation is an operation of opening Toutiao based on the package name. In this embodiment, the framework (for example, the splash screen processing module) may transmit the operation of opening Toutiao to the launcher of the mobile phone. In this case, the launcher of the mobile phone receives the operation of opening Toutiao.

S702. The launcher of the mobile phone invokes a system splash screen management module of the mobile phone, and the system splash screen management module determines that a system splash screen capability is enabled for Toutiao.

Usually, some of the applications installed in the mobile phone have the splash screen function. That is, after the mobile phone receives an operation of opening the application by the user, if the application is cold started, the mobile phone first displays splash screen information, and then displays a page, for example, a home page, of the application. Toutiao is an application that has the splash screen function. Certainly, the applications installed in the mobile phone may further include an application that does not have the splash screen function, for example, an application such as Settings, Messaging, Compass, Calculator, or Recorder. After the mobile phone receives an operation of opening, by the user, the application that does not have the splash screen function, regardless of whether the application is cold started or hot started, the mobile phone directly displays a page of the application. That is, the application that has the splash screen function involves a process of presenting the splash screen information, and an application that does not have a splash screen function does not involve a process of presenting splash screen information. Certainly, for the application that has the splash screen function, if the application is hot started, the splash screen information may be first displayed, and then the page of the application may be displayed. This is not specifically limited in this embodiment.

Therefore, in some embodiments of this application, the mobile phone may store a list, which is referred to as a white list below. The white list includes a package name of the application that is installed in the mobile phone and that does not have the splash screen function. For example, if system applications such as Settings, Messaging, Compass, Calculator, and Recorder are installed in the mobile phone, and these applications do not have the splash screen function, package names of these applications are included in the white list. The white list may be preconfigured, or may be delivered by a configuration server of the operating system to the mobile phone.

When the launcher of the mobile phone receives an operation of opening an application by the user, the launcher of the mobile phone may invoke the operating system of the mobile phone, for example, the framework, to determine whether the application has the splash screen function. For example, the launcher of the mobile phone invokes the system splash screen management module in the framework of the mobile phone, and the system splash screen management module first determines whether the application has the splash screen function, that is, whether a process of presenting splash screen information is involved. For example, the system splash screen management module of the mobile phone may determine whether a package name of the application is included in the white list. If the package name of the application is included in the white list, it indicates that the application does not have the splash screen function, that is, no process of presenting splash screen information is involved. In this case, the application may be started based on an original process of starting the application. In this way, experience of starting the application that does not have the splash screen function is not affected, and compatibility with the procedure of starting the application that does not have the splash screen function is implemented. If the package name of the application is not included in the white list, it indicates that the application is an application that has the splash screen function, that is, the process of presenting the splash screen information is involved. In this case, in some embodiments, when determining that the application is an application that has the splash screen function, the mobile phone may determine that the splash screen information needs to be presented. In some other embodiments, after it is determined that the application is an application that has the splash screen function, the operating system of the mobile phone, for example, the system splash screen management module in the framework, may determine whether the application is cold started. If the application is cold started, it is determined that the splash screen information needs to be presented. For example, the launcher of the mobile phone receives the operation of opening Toutiao by the user, the system splash screen management module determines that the package name of Toutiao is not included in the white list, and Toutiao is cold started. In this case, the mobile phone may determine that splash screen information needs to be presented.

In addition, it may be understood that in the application start procedure that is provided in the conventional technology and that is shown in FIG. 3, after an operation of opening, by the user, an application that has the splash screen function is received, if the application is cold started, the mobile phone first starts the application, and processing logic of the splash screen function is internally completed by the application, to present splash screen information. In this embodiment, the process is referred to as a non-system splash screen. However, in this embodiment, to present the splash screen information in a shorter time, after the operation of opening, by the user, the application that has the splash screen function is received, processing logic of the splash screen function may be completed by using the operating system, to present the splash screen information. In this embodiment, the process is referred to as a system splash screen, and a capability of implementing a system splash screen by the application is referred to as a system splash screen capability.

In this embodiment, an open platform may be provided for a developer of the application, so that the developer of the application applies for enabling or disabling the system splash screen capability of the application for the application of the developer. The developer of the application may apply, through the open platform at anytime, for enabling or disabling the system splash screen capability of the application. The application takes effect in real time after a configuration management server of the open platform approves the application, and a configuration made after the application takes effect may be delivered to all users in an entire network for taking effect. If the developer of the application applies for enabling the system splash screen capability of the application of the developer, after receiving the operation of opening, by the user, the application that has the splash screen function, the mobile phone may present the splash screen information based on a system splash screen process. If the developer of the application applies for disabling (or does not enable) the system splash screen capability of the application of the developer, after receiving the operation of opening, by the user, the application that has the splash screen function, the mobile phone may present the splash screen information based on a non-system splash screen process. In this way, compatibility with an existing splash screen process can be implemented.

In addition, if the developer of the application applies for enabling the system splash screen capability of the application of the developer, the developer may further make a splash screen configuration for the application through the open platform, that is, configure a parameter required for implementing a system splash screen for the application. For example, the splash screen information includes a brand slogan and a splash screen advertisement of the application. In this case, the developer of the application may upload, through the open platform, the brand slogan of the application and a deep link path of a default page (for example, a home page or another page of the application), of the application, that is directly entered after the splash screen information is presented. Based on the configuration by the developer of the application, the configuration management server that provides the open platform may generate splash screen configuration information corresponding to the application. The splash screen configuration information may include an indication indicating whether the system splash screen capability is enabled for the application, the brand slogan of the application, and the deep link path of the page of the application.

The splash screen configuration information of the application that is generated by the configuration management server may be delivered (or synchronized) to the splash screen management server, and the splash screen management server delivers the splash screen configuration information of the application to the mobile phone, so that the mobile phone stores the splash screen configuration information of the application.

For example, the mobile phone may request splash screen configuration information of an application, for example, Toutiao, from the splash screen management server when receiving, for the first time, an operation of opening, by the user, the application that has the splash screen function or each time an operation of opening, by the user, the application that has the splash screen function is received. After receiving request information, the splash screen management server may return the splash screen configuration information of the application to the mobile phone, and the mobile phone may cache the received splash screen configuration information of the application, to facilitate use when the application is opened next time. Alternatively, after receiving request information, the splash screen management server returns splash screen configuration information of all of applications that are in the applications installed in the mobile phone and that have a splash screen configuration function to the mobile phone, and the mobile phone may cache the received splash screen configuration information of all of the applications, to facilitate use when the application and another application that has the splash screen function are opened next time. Certainly, the splash screen configuration information of the application may not be cached in the mobile phone, and the splash screen configuration information of the application is requested from the splash screen management server in real time each time the operation of opening the application by the user is received. This is not specifically limited in this embodiment.

In conclusion, for example, in this embodiment, after receiving an operation of opening an application by the user, the launcher of the mobile phone may invoke the framework, for example, invoke the system splash screen management module in the framework. When invoking the system splash screen management module, the launcher of the mobile phone may transmit a package name of the application to the system splash screen management module. The system splash screen management module first determines, based on the white list, whether the application is an application that has the splash screen function, that is, whether the process of presenting the splash screen information is involved. If it is determined that the package name of the application is included in the white list, that is, the application does not involve the process of presenting the splash screen information, the framework (for example, the splash screen processing module) of the mobile phone may be indicated to start the application based on an original start process of the application.

If it is determined that the package name of the application is not included in the white list, that is, the application involves the process of presenting the splash screen information, the system splash screen management module may determine whether the application is cold started. If the application is not cold started but is hot started, the framework (for example, the splash screen processing module) of the mobile phone may be indicated to start the application based on an original start procedure.

If it is determined that the application is cold started, it indicates that the splash screen information needs to be presented for the application. In this case, the system splash screen management module may obtain splash screen configuration information of the application from the cached splash screen configuration information based on the package name of the application.

If the cached splash screen configuration information does not include the splash screen configuration information of the application, the system splash screen management module may indicate the framework (for example, the splash screen processing module) of the mobile phone to start the application based on the application start procedure shown in FIG. 3, including a process of presenting the splash screen information and presenting a page of the application. In addition, the system splash screen management module of the mobile phone may asynchronously request the splash screen configuration information of the application from the splash screen management server by using the system splash screen service module of the mobile phone. For detailed description, refer to S708 to S711 in this embodiment.

If the cached splash screen configuration information includes the splash screen configuration information of the application, the system splash screen management module may determine, based on the splash screen configuration information of the application, whether a system splash screen capability is enabled for the application. For example, the splash screen configuration information of the application includes an indication indicating whether the system splash screen capability is enabled for the application, and the system splash screen management module may determine, based on the indication, whether the system splash screen capability is enabled for the application.

If the system splash screen management module determines that the system splash screen capability is not enabled for the application, the system splash screen management module may indicate the framework (for example, the splash screen processing module) of the mobile phone to start the application based on the application start procedure shown in FIG. 3, including the process of presenting the splash screen information and presenting the page of the application. If the system splash screen management module determines that the system splash screen capability is enabled for the application, S703 to S705 may be performed.

For example, the application is Toutiao. After receiving the operation of opening Toutiao by the user, the launcher of the mobile phone may invoke the system splash screen management module, and transmit the package name of Toutiao to the system splash screen management module. The system splash screen management module may determine that the package name of Toutiao is not included in the white list. If it is determined that Toutiao is cold started, the system splash screen management module may obtain cached splash screen configuration information of Toutiao based on the package name of Toutiao. After obtaining the splash screen configuration information of Toutiao, the system splash screen management module may determine, based on an indication that indicates whether the system splash screen capability is enabled for the application and that is in the splash screen configuration information, whether the system splash screen capability is enabled for Toutiao. When it is determined that the system splash screen capability is enabled for Toutiao, S703 to S705 may be performed.

Certainly, in some embodiments, it may be considered by default that the system splash screen capability is enabled for all of the applications that have the splash screen function. In this way, when it is determined that an application is an application that has the splash screen function and is cold started, if splash screen information of the application is found from a cache, S703 to S705 may be directly performed.

S703. The system splash screen management module of the mobile phone obtains a cached brand slogan and splash screen advertisement of Toutiao.

S704. The system splash screen management module of the mobile phone loads and renders the brand slogan and the splash screen advertisement of Toutiao.

S705. The mobile phone displays the brand slogan and the splash screen advertisement of Toutiao.

It may be understood that in this embodiment, the processing logic of the splash screen function is completed by using the operating system, so that a time required for presenting splash screen information can be shortened, that is, a page of an application can be presented, in a shorter time, to the user for viewing. To further shorten the time required for presenting the splash screen information, in this embodiment, the splash screen information such as a splash screen advertisement and a splash screen slogan of the application may be first stored in the mobile phone. In this way, when the splash screen information needs to be presented for the application, the splash screen information of the application may be obtained from the cache. However, herein, it is not necessary to obtain the splash screen information of the application from the cache. The mobile phone may obtain the splash screen information in real time when determining that the splash screen information needs to be presented for the application.

For example, the mobile phone obtains splash screen information of Toutiao from the cache. When the system splash screen capability is enabled for Toutiao, the operating system of the mobile phone, for example, the system splash screen management module, may obtain the brand slogan of Toutiao from the cached splash screen configuration information of Toutiao. The operating system of the mobile phone, for example, the system splash screen management module, may further select an appropriate splash screen advertisement from cached splash screen advertisements. The operating system, for example, the system splash screen management module, loads and renders the brand slogan and the splash screen advertisement of Toutiao, and then the mobile phone displays the brand slogan and the splash screen advertisement of Toutiao. In this embodiment, the processing logic of the splash screen function is completed by the operating system, and it takes about 40 ms to present the brand slogan and the splash screen advertisement. A time of presenting the splash screen advertisement may be 3-5 s. The presentation time is configurable. When the splash screen advertisement is presented, a skip button may be displayed on a presentation page of the splash screen advertisement. During presentation of the splash screen advertisement, the user may perform a tap operation on the skip button to skip the splash screen advertisement.

The splash screen advertisements cached in the mobile phone may be obtained based on a download path of the splash screen advertisement requested from the splash screen management server when the mobile phone receives an operation of opening, by the user, any application that has the splash screen function in the mobile phone. In addition, the splash screen advertisements cached in the mobile phone may be dynamically updated when the user opens the application that has the splash screen function in the mobile phone. For detailed description, refer to S712 to S715 in this embodiment.

In some embodiments, the system splash screen management module may select any one of the splash screen advertisements cached in the mobile phone as the splash screen advertisement that can be displayed when Toutiao is currently opened. In some other embodiments, an advertisement-app matching effective rule corresponding to each of the splash screen advertisements cached in the mobile phone may be stored, for example, an application to which the splash screen advertisement is applicable and an application to which the splash screen advertisement is inapplicable. The system splash screen management module may select, based on the advertisement-app matching effective rule of the splash screen advertisement, a splash screen advertisement suitable for Toutiao from the splash screen advertisements cached in the mobile phone. Certainly, if no appropriate splash screen advertisement is selected from the cached splash screen advertisements when Toutiao is currently opened, the splash screen advertisement may not be displayed on a current splash screen.

In addition, in some embodiments, the system splash screen management module of the mobile phone may further collect statistics on events such as actual effective exposure of the splash screen advertisement, an operation of tapping the splash screen advertisement, and an operation of manually skipping the splash screen advertisement by the user, and report the events to the system splash screen service module of the mobile phone in real time. The system splash screen service module of the mobile phone may report these events to the splash screen management server for statistics collection and commercial settlement. The system splash screen service module may further calculate an exposure frequency of the splash screen advertisement in real time, and notify the system splash screen management module of the exposure frequency. The system splash screen management module may properly select, based on the exposure frequency notified by the system splash screen service module and exclusiveness and relevance of the splash screen advertisement, a splash screen advertisement presented when an application that has the splash screen function is opened next time, to control an exposure frequency and a time interval of a same splash screen advertisement, so as to improve user experience. For example, the system splash screen management module may update, based on the exposure frequency of the splash screen advertisement that is notified by the system splash screen service module, a list of applications (namely, applications for which the splash screen advertisement may be presented) supported by the splash screen advertisement, to control the exposure frequency and the time interval of the splash screen advertisement.

S706. The system splash screen management module of the mobile phone invokes the splash screen management module of the mobile phone, and the splash screen management module initializes Toutiao.

The mobile phone may complete the processing logic of the splash screen function by using the operating system, and may also initialize Toutiao and load and render a page of Toutiao by using the operating system, for example, the framework. For example, after the system splash screen management module determines that the system splash screen capability is enabled for Toutiao in S702, the system splash screen management module of the mobile phone may notify the splash screen processing module in the framework of the mobile phone in parallel. The splash screen processing module of the mobile phone initializes Toutiao in background based on a deep link path of the page of the application in the splash screen configuration information of Toutiao, and may further load and render a home page based on the deep link path. Original splash screen processing logic internally completed by the application is directly skipped. In this way, an experience problem and a traffic cheating problem of the splash screen advertisement caused by presenting the splash screen advertisement for two times can be avoided.

S707. After initialization of Toutiao is completed, and presentation of the splash screen advertisement is completed or an operation of tapping, by the user, to skip the splash screen advertisement is received, the mobile phone displays the page of Toutiao.

After Toutiao is initialized, and the splash screen advertisement is presented in S705 or the operation of tapping, by the user, to skip the splash screen advertisement is received, the mobile phone may display the page of Toutiao. For example, the page may be a page corresponding to the deep link path included in the splash screen configuration information of Toutiao. The page may be the home page of Toutiao or another page of Toutiao. In this way, after a system splash screen is ended, the page of the application may be directly entered for viewing by the user. Therefore, user experience of starting the application can be improved, and a case in which a splash screen process is repeatedly performed in the system and the application can be avoided, to avoid a flickering screen and a problem of media traffic cheating.

In addition, a developer of an application (Toutiao) may change a system splash screen configuration of the application at any time. For example, the system splash screen capability of the application is changed from enabled to disabled, or from disabled to enabled. For another example, when a system splash screen capability of the application is enabled, the developer of the application changes a brand slogan of the application and/or a default page, of the application, that is directly entered after splash screen information is presented. Therefore, after the developer changes the system splash screen configuration of the application, to enable a changed system splash screen configuration of the application to take effect on a user side in a timely manner, this embodiment of this application may further include the following steps: S708 to S711.

S708. The system splash screen management module of the mobile phone requests splash screen configuration information of an application from the system splash screen service module of the mobile phone.

S709. The system splash screen service module of the mobile phone sends request information to the splash screen management server, where the request information is used to obtain the splash screen configuration information of the application.

S710. The splash screen management server returns the splash screen configuration information of the application to the system splash screen service module of the mobile phone.

S711. The system splash screen service module of the mobile phone updates and stores the splash screen configuration information of the application, and synchronizes an updated result to the system splash screen management module of the mobile phone.

After the mobile phone receives an operation of opening an application by the user, if it is determined that the application is an application that has the splash screen function, in consideration of the fact that a developer of the application may change a system splash screen configuration of the application at any time, the operating system of the mobile phone, for example, the system splash screen management module, may request splash screen configuration information of the application from the splash screen management server by using a networking capability of the system splash screen service module of the mobile phone.

In some embodiments, the mobile phone may request the splash screen configuration information only of the application from the splash screen management server. For example, after the mobile phone receives the operation of opening Toutiao by the user, the system splash screen management module of the mobile phone may request the splash screen configuration information of Toutiao from the system splash screen service module. For example, when sending a request, the system splash screen management module adds the package name of Toutiao to the request. The system splash screen service module of the mobile phone may send, to the splash screen management server, request information that carries the package name of Toutiao, to obtain the splash screen configuration information of Toutiao. After receiving the request information that carries the package name of Toutiao, the splash screen management server may return the splash screen configuration information of Toutiao to the system splash screen service module of the mobile phone. The system splash screen service module of the mobile phone may update and store the splash screen configuration information of Toutiao based on the received splash screen configuration information, and may further synchronize the splash screen configuration information to the system splash screen management module of the mobile phone, to facilitate use when Toutiao is opened next time.

In some other embodiments, the mobile phone may request the splash screen configuration information of all of the applications that are included in the mobile phone and that have the splash screen function from the splash screen management server. For example, after the mobile phone receives the operation of opening Toutiao by the user, the system splash screen management module of the mobile phone may request the splash screen configuration information of all of the applications that are included in the mobile phone and that have the splash screen function from the system splash screen service module. For example, when sending a request, the system splash screen management module adds package names of all of the applications that are included in the mobile phone and that have the splash screen function. The system splash screen service module of the mobile phone may send, to the splash screen management server, request information that carries the package names of all of the applications that are included in the mobile phone and that have the splash screen function, to obtain the splash screen configuration information of all of the applications that are included in the mobile phone and that have the splash screen function. After receiving the request information, the splash screen management server may return the splash screen configuration information of these applications to the system splash screen service module of the mobile phone. The system splash screen service module of the mobile phone may update and store the splash screen configuration information of the corresponding application based on the received splash screen configuration information, and may further synchronize the splash screen configuration information to the system splash screen management module of the mobile phone, to facilitate use when the application is opened next time. Alternatively, a list of all of the applications that are installed in the mobile phone and that have the splash screen function may be managed and maintained on a splash screen management server side. In this case, when the mobile phone needs to request the splash screen configuration information of all of the applications that are included in the mobile phone and that have the splash screen function, the package names of all of the applications that are included in the mobile phone and that have the splash screen function may not be carried, and the splash screen management server may learn of, based on the mobile phone that requests the splash screen configuration information and the maintained list, applications for which splash screen configuration information needs to be returned to the mobile phone. In addition, in this embodiment, when returning the splash screen configuration information of the application to the mobile phone, the splash screen management server may return only a part that differs the splash screen configuration information of all of the applications that are installed in the mobile phone and that have the splash screen function from previously returned splash screen configuration information, instead of all the information. In this way, efficiency of synchronizing the splash screen configuration information can be improved.

In addition, to update, in a timely manner, the splash screen advertisements locally stored in the mobile phone and increase a hit rate of the splash screen advertisement, this embodiment may further include the following steps: S712 to S715.

S712. The system splash screen management module of the mobile phone requests a splash screen advertisement from the system splash screen service module of the mobile phone.

S713. The system splash screen service module of the mobile phone sends an advertisement request to the splash screen management server, where the advertisement request is used to obtain a splash screen advertisement.

S714. The splash screen management server returns advertisement creative information to the system splash screen service module of the mobile phone, where the advertisement creative information includes a download path of the splash screen advertisement.

S715. The system splash screen service module of the mobile phone updates the cached splash screen advertisements, and synchronizes an updated result to the system splash screen management module of the mobile phone.

After the mobile phone receives an operation of opening an application by the user, if it is determined that the application is an application that has the splash screen function and a system splash screen capability is enabled for the application, to update the cached splash screen advertisements in a timely manner and increase the hit rate of the splash screen advertisement, the operating system of the mobile phone, for example, the system splash screen management module, may request the splash screen advertisement from the splash screen management server by using the networking capability of the system splash screen service module of the mobile phone.

For example, the mobile phone receives the operation of opening Toutiao by the user. The system splash screen management module of the mobile phone may request a splash screen advertisement from the system splash screen service module of the mobile phone. The package of Toutiao may be carried. The system splash screen service module may send, to the splash screen management server in real time, an advertisement request used to obtain the splash screen advertisement. The advertisement request may carry the package name of Toutiao. After receiving the advertisement request that carries the package name of Toutiao, the splash screen management server may perform operations such as audience targeting, traffic scheduling, click-through rate prediction, and bidding ranking based on the package name, and return advertisement creative information through final decision. The advertisement creative information may include a download path of the splash screen advertisement, and may further include an ID of the splash screen advertisement, a price, a promotion task to which the splash screen advertisement belongs, and the like. In addition, the splash screen management server may further return an advertisement-app matching effective rule of the splash screen advertisement to the system splash screen service module of the mobile phone. For example, the advertisement-app matching effective rule includes a list of applications (namely, applications for which the splash screen advertisement may be presented) supported by the splash screen advertisement, and is used by the mobile phone to select a splash screen advertisement suitable for an application from the cached splash screen advertisements. After receiving the advertisement creative information, the system splash screen service module of the mobile phone may determine, based on the advertisement creative information, for example, the ID included in the advertisement creative information, whether the mobile phone downloads the splash screen advertisement. If the mobile phone does not download the splash screen advertisement, the mobile phone may download the corresponding splash screen advertisement from a CDN server based on the download path in the advertisement creative information. Then, the system splash screen service module of the mobile phone updates the cached splash screen advertisement, and indicates, based on an update status, the system splash screen management module of the mobile phone to update the splash screen advertisement. The system splash screen service module may alternatively update, based on the advertisement-app matching effective rule of the splash screen advertisement, the list of applications supported by the splash screen advertisement and the like, and notify the system splash screen management module of the mobile phone. The system splash screen service module of the mobile phone may further periodically delete a splash screen advertisement that is removed, and synchronize an updated result to the system splash screen management module of the mobile phone. In this way, preparations can be made for starting any application that has the splash screen function next time.

It should be noted that in this embodiment of this application, there is no limitation on a sequence of performing S702 to S707 and S708 to S711. For example, in some embodiments, S702 to S707 and S708 to S711 may be simultaneously performed. For example, after the mobile phone determines that the application is an application that has the splash screen function, S702 to S707 may be performed, and S708 to S711 may be further asynchronously performed. Similarly, there is no limitation on a sequence of performing S702 to S707 and S712 to S715.

According to the method for displaying splash screen information of an application provided in this embodiment of this application, after receiving the operation of opening, by the user, the application that has the splash screen function, the mobile phone may complete the processing logic of the splash screen function by using the operating system. In this way, based on a processing advantage of the operating system, an effect of the splash screen information can be seen in tens of milliseconds. That is, the splash screen information can be presented in a shorter time, and then the page of the application can be presented, in a shorter time, to the user for viewing. Therefore, man-machine interaction performance and user experience are improved. In addition, according to the method provided in this embodiment of this application, the splash screen advertisement that needs to be presented in currently starting the application is selected from the plurality of cached splash screen advertisements. In this way, a rate of successfully presenting the splash screen advertisement can be increased, a loss and waste of traffic used to present the splash screen advertisement are avoided, a click-through rate of the splash screen advertisement is increased, and commercial revenues of the application are increased.

In addition, regardless of whether the user opens the application by performing an operation on the icon of the application that is displayed on the desktop or by performing an operation on the link of the application in another application, processing is performed by the launcher of the mobile phone, to ensure consistency of splash screen experience of the application. When the operation of opening the application by the user is received, and it is determined that the application is an application that has the splash screen function, the splash screen configuration information of the application or the splash screen configuration information of all of the applications that have the splash screen function in the electronic device is asynchronously requested from the splash screen management server, so that the splash screen configuration of the application can be synchronized to the user side in a timely manner when a splash screen configuration of the application is changed, thereby improving timeliness of updating the splash screen configuration of the application. In this embodiment, all of the applications that are installed in the mobile phone and that have the splash screen function may share the locally cached splash screen advertisements. In this way, traffic of downloading the splash screen advertisement by the user can be saved, performance of the mobile phone is improved, and power consumption is reduced. In addition, when an operation of opening, by the user, an application that has the splash screen function is received and a system splash screen capability is enabled for the application, a new splash screen advertisement is obtained from the splash screen management server. In this way, the locally cached splash screen advertisements can be updated in a timely manner, and therefore there is a higher hit rate achieved by preloading the splash screen advertisement.

Some other embodiments of this application further provide a computer storage medium. The computer storage medium may include computer instructions. When the computer instructions are run on an electronic device, the electronic device is enabled to perform the method for displaying splash screen information of an application in the embodiment shown in FIG. 7A and FIG. 7B.

Some other embodiments of this application further provide a computer program product. When the computer program product is run on a computer, the computer is enabled to perform the method for displaying splash screen information of an application in the embodiment shown in FIG. 7A and FIG. 7B.

Some other embodiments of this application further provide an apparatus. The apparatus has a function of implementing behavior of the electronic device in the foregoing method. The function may be implemented by hardware, or may be implemented by corresponding software executed by hardware. The hardware or software includes one or more modules corresponding to the function, for example, a display unit or module, an input unit or module, a system splash screen management unit or module, a splash screen processing unit or module, and a system splash screen service unit or module.

Figure 8:
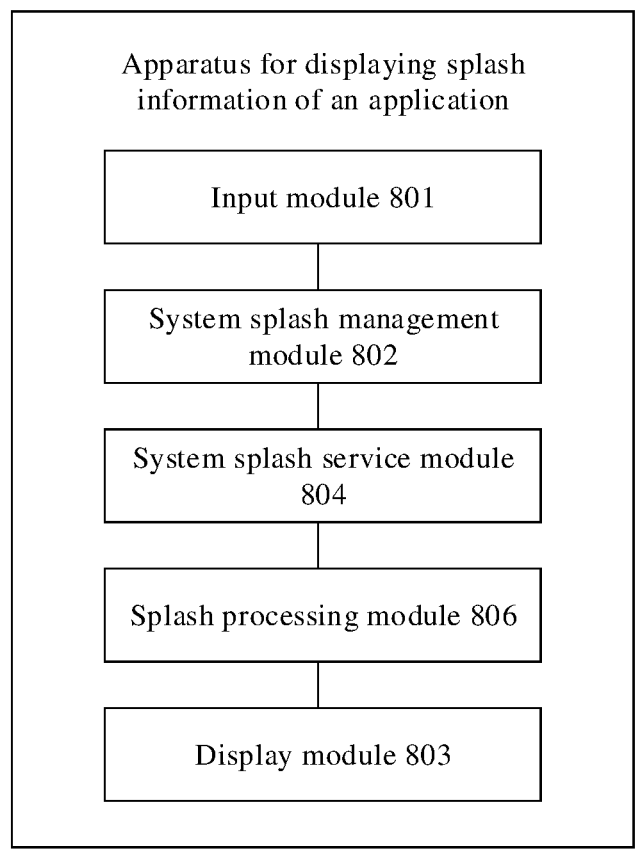
FIG. 8 is a schematic diagram of composition of an apparatus for displaying splash screen information of an application according to an embodiment of this application.

In an example, an embodiment provides an apparatus for displaying splash screen information of an application. As shown in FIG. 8, the apparatus for displaying splash screen information of an application may include an input module 801, a system splash screen management module 802, and a display module 803.

The input module 801 is configured to receive an operation of opening a first application by a user.

The system splash screen management module 802 is configured to: determine that the first application has a splash screen function; determine that a system splash screen capability is enabled for the first application; obtain splash screen information of the first application, where the splash screen information includes a brand slogan and/or a splash screen advertisement of the first application; and load and render the splash screen information of the first application.

The display module 803 is configured to display the splash screen information of the first application.

The display module 803 is further configured to display a page of the first application after the first application is started.

Further, an electronic device further includes a storage module, configured to store a list, the list includes a package name of an application that does not have the splash screen function, and that the system splash screen management module 802 is configured to determine that the first application has a splash screen function includes: The system splash screen management module 802 determines that a package name of the first application is not included in the list.

Further, that the system splash screen management module 802 is configured to determine that a system splash screen capability is enabled for the first application includes: The system splash screen management module 802 determines, based on a cached indication indicating whether the system splash screen capability is enabled for the first application, that the system splash screen capability is enabled for the first application.

Further, when the splash screen information includes the splash screen advertisement, that the system splash screen management module 802 is configured to obtain the splash screen advertisement includes: The system splash screen management module 802 obtains the splash screen advertisement from a plurality of cached splash screen advertisements.

Further, when the splash screen information includes the brand slogan of the first application, that the system splash screen management module 802 is configured to obtain the brand slogan of the first application includes: The system splash screen management module 802 obtains the cached brand slogan of the first application.

Further, the system splash screen management module 802 is further configured to determine that the first application is cold started.

Further, the apparatus may further include a system splash screen service module 804.

The system splash screen management module 802 is further configured to request splash screen configuration information of the first application from the system splash screen service module 804. The splash screen configuration information of the first application includes the brand slogan of the first application and the indication indicating whether the system splash screen capability is enabled for the first application.

The system splash screen service module 804 is configured to: send a request message to a splash screen management server, where the request message is used to request the splash screen configuration information of the first application; and receive the splash screen configuration information of the first application from the splash screen management server, or receive splash screen configuration information of some or all of applications that are included in the electronic device and that have the splash screen function from the splash screen management server.

The system splash screen service module 804 is further configured to: update cached splash screen configuration information of the corresponding application based on the received splash screen configuration information, and synchronize an updated result to the system splash screen management module 802.

Further, the apparatus may further include a splash screen processing module 806.

The splash screen processing module 806 is configured to initialize the first application.

The display module 803 is specifically configured to display the page of the first application after initialization is completed and the splash screen advertisement is presented or an operation of tapping, by the user, to skip the splash screen advertisement is received.

Further, the splash screen configuration information of the first application may further include a deep link path of the page of the first application, and That the display module 803 displays a page of the first application includes: The display module 803 displays the page of the first application based on the deep link path.

Further, the system splash screen management module 802 is further configured to request a splash screen advertisement from the system splash screen service module 804.

The system splash screen service module 804 is further configured to: send an advertisement request to the splash screen management server, where the advertisement request is used to request the splash screen management server to deliver a splash screen advertisement; and receive advertisement creative information from the splash screen management server, where the advertisement creative information includes an advertisement download path.

The system splash screen service module 804 is further configured to: download a corresponding splash screen advertisement based on the advertisement download path, update a cache, and synchronize an updated result to the system splash screen management module 802.

Further, that the input module 801 is configured to receive an operation of opening a first application by a user includes: The input module 801 receives a tap operation performed by the user on a displayed icon of the first application.

Further, that the input module 801 is configured to receive an operation of opening a first application by a user includes: The input module 801 receives a tap operation performed by the user on a link of the first application. The link of the first application is included on a page of a second application, and the tap operation performed by the user on the link of the first application is used to open the first application, is received by a splash screen processing module 806, and is transmitted by the splash screen processing module 806 to the input module 8oi.

The terminal, the computer storage medium, the computer program product, and the chip provided in the embodiments of this application each are configured to perform the corresponding method provided above. Therefore, for beneficial effects that can be achieved by the terminal, the computer storage medium, the computer program product, and the chip, refer to the beneficial effects in the corresponding method provided above. Details are not described herein again.

The foregoing description about the implementations allows a person skilled in the art to clearly understand that, for the purpose of convenient and brief description, division into only the foregoing function modules is used as an example for description. During actual application, the foregoing functions can be allocated to different function modules for implementation as required. In other words, an inner structure of an apparatus is divided into different function modules to implement all or some of the functions described above.

In the several embodiments provided in this application, it should be understood that the disclosed apparatus and method may be implemented in other manners. For example, the described apparatus embodiments are merely examples. For example, division into the modules or units is merely logical function division. There may be another division manner in actual implementation. For example, a plurality of units or components may be combined or may be integrated into another apparatus, or some features may be ignored or not be performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate components may or may not be physically separate, and components displayed as units may be one or more physical units, that is, may be located in one place, or may be distributed on a plurality of different places. Some or all of the units may be selected depending on actual requirements to achieve the objectives of the solutions in the embodiments.

In addition, functional units in the embodiments of this application may be integrated into one processing unit, or each of the units may exist alone physically, or two or more units may be integrated into one unit. The integrated unit may be implemented in a form of hardware, or may be implemented in a form of a software functional unit.

When the integrated unit is implemented in a form of a software function unit and sold or used as an independent product, the integrated unit may be stored in a readable storage medium. Based on such an understanding, the technical solutions of the embodiments of this application essentially, or the part contributing to the current technology, or all or some of the technical solutions may be implemented in a form of a software product. The software product is stored in a storage medium and includes several instructions for instructing a device (which may be a single-chip microcomputer, a chip, or the like) or a processor (processor) to perform all or some of the steps of the methods in the embodiments of this application. The foregoing storage medium includes various media that can store program code, such as a USB flash drive, a removable hard disk, a read-only memory (Read-Only Memory, ROM), a random access memory (Random Access Memory, RAM), a magnetic disk, and an optical disc.

The foregoing descriptions are merely specific implementations of this application, but are not intended to limit the protection scope of this application. Any variation or replacement within the technical scope disclosed in this application shall fall within the protection scope of this application. Therefore, the protection scope of this application shall be subject to the protection scope of the claims.

What is claimed is:

1. A method comprising:
    receiving, by an electronic device, a user operation, performed by a user, of opening a first application;
    determining, by the electronic device, using an operating system of the electronic device, that the first application has a splash screen function;
    determining, by the electronic device, using the operating system, that a system splash screen capability is enabled for the first application;
    obtaining, by the electronic device, using the operating system, splash screen information of the first application, wherein the splash screen information comprises at least one of a brand slogan or a splash screen advertisement of the first application;
    loading and rendering, by the electronic device, using the operating system, the splash screen information of the first application;
    displaying, by the electronic device, the splash screen information of the first application; and
    starting, by the electronic device, the first application after the displaying the splash screen information, and displaying a page of the first application,
    wherein all processing logic of the determining that the first application has the splash screen function, the determining that the system splash screen capability is enabled, the obtaining, and the loading and rendering is completely performed by an application framework layer of the operating system, the application framework layer being between an application layer and a kernel layer.

2. The method of claim 1, wherein the application framework layer includes a system splash management module as a software development kit (SDK) and a splash processing module, and wherein the system splash management module and the splash processing module provide for completely performing all the processing logic of the determining that the first application has the splash screen function, determining that the system splash screen capability is enabled, the obtaining, and the loading and rendering.

3. The method according to claim 1, wherein the operating system comprises a launcher; and
    wherein the receiving the user operation of opening the first application comprises:
        receiving, by the electronic device, using the launcher, the user operation, performed by the user, of opening the first application.

4. The method according to claim 3, wherein the receiving, by the electronic device by using the launcher, the user operation of opening the first application comprises:
    receiving, by the electronic device, using the launcher, a tap operation performed by the user on a displayed icon of the first application.

5. The method according to claim 3, wherein the receiving, by the electronic device by using the launcher, the user operation of opening the first application comprises:
    receiving, by the electronic device, using the launcher, a tap operation performed by the user on a link of the first application, wherein the link of the first application is disposed on a second page of a second application, wherein the tap operation indicates to open the first application, wherein the tap operation is received by a splash screen processing module of the operating system, and wherein the tap operation is transmitted by the splash screen processing module to the launcher.

6. The method according to claim 1, wherein the operating system comprises a system splash screen management module, wherein the electronic device stores a list comprising a package name of an application that does not have the splash screen function; and
    wherein the determining that the first application has the splash screen function comprises:
        determining, by the electronic device, using the system splash screen management module, that a first package name of the first application is not in the list.

7. The method according to claim 6, wherein the determining that the system splash screen capability is enabled for the first application comprises:
    determining, by the electronic device, using the system splash screen management module, based on a cached indication indicating whether the system splash screen capability is enabled for the first application, that the system splash screen capability is enabled for the first application.

8. The method according to claim 6, wherein the obtaining the splash screen information of the first application by using the operating system comprises:
    obtaining, by the electronic device, the splash screen advertisement from a plurality of cached splash screen advertisements using the system splash screen management module.

9. The method according to claim 6, wherein the obtaining, by the electronic device, the splash screen information of the first application by using the operating system comprises:
    obtaining, by the electronic device, a cached brand slogan of the first application by using the system splash screen management module.

10. The method according to claim 6, further comprising performing, after the determining that the first application has the splash screen function:
    determining, by the electronic device by using the system splash screen management module, that the first application is cold started.

11. The method according to claim 6, wherein the operating system further comprises a system splash screen service module; and wherein the method further comprises:
requesting, by the system splash screen management module of the electronic device, splash screen configuration information of the first application from the system splash screen service module, wherein the splash screen configuration information of the first application comprises the brand slogan of the first application and an indication indicating whether the system splash screen capability is enabled for the first application;
sending, by the electronic device, a request message to a splash screen management server using the system splash screen service module, wherein the request message requests the splash screen configuration information of the first application;
receiving, by the electronic device, at least one of the splash screen configuration information of the first application from the splash screen management server using the system splash screen service module, or additional splash screen configuration information of some or all of applications that are comprised in the electronic device and that have the splash screen function from the splash screen management server by using the system splash screen service module; and
updating, by the system splash screen service module of the electronic device, cached splash screen configuration information of a corresponding application based on corresponding splash screen configuration information, and synchronizing an updated result to the system splash screen management module.

12. The method according to claim 11, further comprising:
requesting, by the system splash screen management module of the electronic device, the splash screen advertisement from the system splash screen service module;
sending, by the electronic device, an advertisement request to the splash screen management server using the system splash screen service module, wherein the advertisement request requests the splash screen management server to deliver the splash screen advertisement;
receiving, by the electronic device, advertisement creative information from the splash screen management server using the system splash screen service module, wherein the advertisement creative information comprises an advertisement downloading path; and
downloading, by the electronic device, a corresponding splash screen advertisement using the system splash screen service module and based on the advertisement downloading path, updating a cache, and synchronizing the updated result to the system splash screen management module.

13. The method according to claim 11, wherein the operating system further comprises a splash screen processing module; and
wherein the starting the first application, and displaying the page of the first application comprises:
initializing, by the electronic device, the first application using the splash screen processing module; and
displaying, by the electronic device, the page of the first application after the initialization is completed and the splash screen advertisement is presented or the user operation of tapping, by the user, to skip the splash screen advertisement is received.

14. The method according to claim 13, wherein the splash screen configuration information of the first application further comprises a deep link path of the page of the first application; and
wherein the displaying the page of the first application comprises:
displaying, by the electronic device, the page of the first application based on the deep link path.

15. An electronic device, comprising:
one or more processors;
a non-transitory computer readable memory;
a display screen; and
an input device;
wherein the non-transitory computer readable memory stores one or more programs for execution by the one or more processors, wherein the one or more programs include instructions to cause the electronic device to perform operations including:
receiving a user operation, performed by a user, of opening a first application;
determining, using an operating system of the electronic device, that the first application has a splash screen function;
determining, using the operating system, that a system splash screen capability is enabled for the first application;
obtaining, using the operating system, splash screen information of the first application, wherein the splash screen information comprises at least one of a brand slogan or a splash screen advertisement of the first application;
loading and rendering, using the operating system, the splash screen information of the first application;
displaying the splash screen information of the first application; and
starting the first application after displaying the splash screen information, and displaying a page of the first application,
wherein all processing logic of the determining that the first application has the splash screen function, the determining that the system splash screen capability is enabled, the obtaining, and the loading and is completely performed by an application framework layer of the operating system, the application framework layer being between an application layer and a kernel layer.

16. The electronic device according to claim 15, wherein the receiving the user operation of opening the first application comprises:
receiving using a launcher of the operating system, the user operation, performed by the user, of opening the first application.

17. The electronic device according to claim 15, wherein the electronic device stores a list comprising a package name of an application that does not have the splash screen function; and
wherein the determining that the first application has the splash screen function comprises:
determining, using a system splash screen management module of the operating system, that a first package name of the first application is not in the list.

18. The electronic device according to claim 17, the operations further comprising:
requesting, by the system splash screen management module of the electronic device, splash screen configuration information of the first application from a system splash screen service module of the operating system, wherein the splash screen configuration information of the first application comprises the brand slogan of the first application and an indication indicating whether the system splash screen capability is enabled for the first application;

sending a request message to a splash screen management server using the system splash screen service module, wherein the request message requests the splash screen configuration information of the first application;

receiving, by the electronic device, at least one of the splash screen configuration information of the first application from the splash screen management server using the system splash screen service module, or additional splash screen configuration information of some or all of applications that are comprised in the electronic device and that have the splash screen function from the splash screen management server by using the system splash screen service module; and updating, by the system splash screen service module of the electronic device, cached splash screen configuration information of a corresponding application based on corresponding splash screen configuration information, and synchronizing an updated result to the system splash screen management module.

19. A non-transitory computer storage medium, storing computer instructions for execution by an electronic device, the computer instructions including instructions to cause the electronic device to perform operations including:

receiving a user operation, performed by a user, of opening a first application;

determining, using an operating system of the electronic device, that the first application has a splash screen function;

determining, using the operating system, that a system splash screen capability is enabled for the first application;

obtaining, using the operating system, splash screen information of the first application, wherein the splash screen information comprises at least one of a brand slogan or a splash screen advertisement of the first application;

loading and rendering, using the operating system, the splash screen information of the first application;

displaying the splash screen information of the first application; and starting the first application after displaying the splash screen information, and displaying a page of the first application, wherein all processing logic of the determining that the first application has the splash screen function, the determining that the system splash screen capability is enabled, the obtaining, and the loading and rendering is completely performed by an application framework layer of the operating system, the application framework layer being between an application layer and a kernel layer.

20. The non-transitory computer storage medium according to claim 19, wherein the receiving the user operation of opening the first application comprises:

receiving using a launcher of the operating system, the user operation, performed by the user, of opening the first application.

21. The non-transitory computer storage medium according to claim 19, wherein the electronic device stores a list comprising a package name of an application that does not have the splash screen function; and wherein the determining that the first application has the splash screen function comprises:

determining, using a system splash screen management module of the operating system, that a first package name of the first application is not in the list.

* * * * *